United States Patent
Miyata et al.

(10) Patent No.: US 12,165,074 B2
(45) Date of Patent: Dec. 10, 2024

(54) DEVICE, SYSTEM AND METHOD FOR ESTIMATING AN EXTERNAL OR INTRINSIC FACTOR RESULTING IN A STATE TRANSITION

(71) Applicant: OMRON Corporation, Kyoto (JP)

(72) Inventors: Kiichiro Miyata, Toyonaka (JP); Tanichi Ando, Komaki (JP); Hiroyuki Miyaura, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 648 days.

(21) Appl. No.: 16/490,915

(22) PCT Filed: Feb. 26, 2018

(86) PCT No.: PCT/JP2018/007022
§ 371 (c)(1),
(2) Date: Sep. 4, 2019

(87) PCT Pub. No.: WO2018/163890
PCT Pub. Date: Sep. 13, 2018

(65) Prior Publication Data
US 2020/0012955 A1    Jan. 9, 2020

(30) Foreign Application Priority Data
Mar. 8, 2017  (JP) ................................ 2017-044375

(51) Int. Cl.
*G06N 5/04*    (2023.01)
*G06N 20/00*   (2019.01)

(52) U.S. Cl.
CPC ............. *G06N 5/04* (2013.01); *G06N 20/00* (2019.01)

(58) Field of Classification Search
CPC ............ G06N 5/04; G06N 20/00; G06N 3/08; G06N 3/126; G06N 5/022; G06N 5/045;
(Continued)

(56) References Cited

U.S. PATENT DOCUMENTS 9,305,216 B1 * 4/2016 Mishra ................. G06F 16/583
2006/0265228 A1   11/2006 Ando
(Continued)

FOREIGN PATENT DOCUMENTS

CN         1873645 A     12/2006
CN       101052294 A     10/2007
(Continued)

OTHER PUBLICATIONS

S. Duan and S. Babu, "Guided Problem Diagnosis through Active Learning," 2008 International Conference on Autonomic Computing, 2008, pp. 45-54, doi: 10.1109/ICAC.2008.28. (Year: 2008).*
(Continued)

*Primary Examiner* — Luis A Sitiriche
(74) *Attorney, Agent, or Firm* — METROLEX IP LAW GROUP, PLLC; Robert L. Scott, Esq.

(57) ABSTRACT

A factor estimation device is configured to receive information pertaining to objects, to extract state information from the information received, to identify a predetermined state pertaining to a first object from among the objects, to receive state information extracted that corresponds to the predetermined state and classify the predetermined state, to extract condition information from the information received, to identify the condition up until the predetermined state, and to receive condition information that is output by the condition-information extraction unit and corresponds to the condition identified and classify the condition identified. Subsequently, the factor estimation device is configured to estimate the condition that may result in the predetermined
(Continued)

state on the basis of the result of classifying the predetermined state and the result of classifying the identified condition.

5 Claims, 23 Drawing Sheets

(58) Field of Classification Search
CPC ...... G06N 3/006; G06N 3/044; G06N 3/0455; G06N 3/09; G06N 3/063; G06N 20/20; G06N 3/04; G06N 3/045; G06N 3/084; G06N 7/01; G06N 3/088; G06N 3/092; G06N 3/098; G06N 5/01; G06N 5/048; G06N 3/0442

See application file for complete search history.

(56) References Cited

U.S. PATENT DOCUMENTS

| | | |
|---|---|---|
| 2007/0005853 A1 | 1/2007 | Nakajima et al. |
| 2007/0239651 A1 | 10/2007 | Koga et al. |
| 2008/0255772 A1 | 10/2008 | Sjostrand et al. |
| 2012/0102371 A1 | 4/2012 | Tonouchi |
| 2012/0136819 A1 | 5/2012 | Pandey et al. |
| 2013/0132000 A1 | 5/2013 | Tamaki |
| 2013/0262359 A1 | 10/2013 | Sambongi |
| 2017/0028593 A1* | 2/2017 | Maruyama .......... B29C 37/0096 |
| 2017/0262360 A1* | 9/2017 | Kochura ............. G06F 11/3688 |

FOREIGN PATENT DOCUMENTS

| | | |
|---|---|---|
| CN | 101241359 A | 8/2008 |
| CN | 102539129 A | 7/2012 |
| CN | 103366221 A | 10/2013 |
| CN | 106393622 A | 2/2017 |
| JP | H07-110771 A | 4/1995 |
| JP | H11175144 A | 7/1999 |
| JP | 2003091600 A | 3/2003 |
| JP | 4150965 B2 | 7/2008 |
| JP | 2011-175504 A | 9/2011 |
| JP | 2011243118 A | 12/2011 |
| JP | 2012235372 A | 11/2012 |

OTHER PUBLICATIONS

J. W. Sheppard, "Explanation-based learning with diagnostic models," Conference Record Autotestcon '92: The IEEE Systems Readiness Technology Conference, 1992, pp. 159-166, doi: 10.1109/AUTEST.1992.270118. (Year: 1992).*

Anonymous Disclosure. "Continuous Integration System that Leverages Machine Learning to Diagnose Build Failures." IP.com Prior Art Database Technical Disclosure. IP.com No. IPCOM000232626D. IP.com Electronic Publication Date: Nov. 22, 2013. (Year: 2013).*

Jiang et al.—"An Intelligent Information Forwarder for Healthcare Big Data Systems With Distributed Wearable Sensors"—2016—https://ieeexplore.ieee.org/stamp/stamp.jsp?tp=&arnumber=6775278 (Year: 2016).*

An English translation of the International Search Report("ISR") of PCT/JP2018/007022 mailed on Apr. 24, 2018.

The Written Opinion("WO") of PCT/JP2018/007022 mailed on Apr. 24, 2018.

Forkan Abdur Rahim Mohammad et al., "A context-aware approach for long-term behavioural change detection and abnormality prediction in ambient assisted living", Pattern Recognition, Jul. 1, 2014, pp. 628-641, vol. 48, No. 3, Elsevier Ltd.; Relevance is indicated in the EESR issued on Dec. 14, 2020.

The extended European search report ("EESR") issued on Dec. 14, 2020 in a counterpart European patent application.

The Office Action (CNOA) issued on Aug. 26, 2022, in a counterpart Chinese patent application.

* cited by examiner

DEVICE, SYSTEM AND METHOD FOR ESTIMATING AN EXTERNAL OR INTRINSIC FACTOR RESULTING IN A STATE TRANSITION

FIELD

The present invention relates to a technology for estimating a factor that results in a certain outcome.

BACKGROUND

It is generally difficult to analyze what in a person's work or daily life has caused a certain outcome (such as a person entering a certain state). The same is true for inanimate objects such as machines used for a specific business operation. It is possible to estimate what factor or factors have resulted in an outcome when a causal relationship is known. When the causal relationship is unknown, however, it tends to be difficult to determine what factor or factors have resulted in the outcome. For instance, it is not easy to identify a certain behavior of a person or a certain phenomenon that occurs around a person as the factor that caused a certain outcome because many external factors are involved.

Recent years have seen a rapid advancement of technologies that employ deep learning. The use of deep learning techniques has allowed technologies such as image recognition in particular, to reach a level of capability similar to humans. On the other hand, it is not easy for a machine to acquire an ability that a human does not possess. This is because teaching data cannot be created for the purpose of machine learning, as is the case when a causal relationship is unknown.

To date, no service or device on the market provides a machine that can learn an ability and use the ability to estimate a contributing factor for an outcome where the factor has no known relationship with the outcome.

In light of the foregoing, the present invention aims to provide a device, a system and a method that can estimate a factor that results in a certain outcome.

SUMMARY

A first embodiment of the present invention provides a factor estimation device including: an object-information input unit configured to receive information pertaining to objects, a state-information extraction unit configured to extract state information from the information received, a state identification unit configured to identify a predetermined state pertaining to a first object from among the objects, a state classification unit configured to receive state information which corresponds to the predetermined state and that is output by the state-information extraction unit, and to classify the aforementioned predetermined state; a condition-information extraction unit configured to extract condition information from the information received; a condition identification unit configured to identify the condition up until the predetermined state; a condition classification unit configured to receive condition information which corresponds to the condition identified and that is output by the condition-information extraction unit, and to classify the aforementioned condition identified; and a factor estimation unit configured to estimate the condition that results in the predetermined state on the basis of the result of classifying the predetermined state and the result of classifying the identified condition.

A second embodiment of the present invention involves the factor estimation unit storing a history of a condition change pattern that represents a condition during a period of transition from a first state to a second state; and the factor estimation unit identifying a condition common to a condition change pattern corresponding to the result of classifying the predetermined condition and the result of classifying the condition identified as the factor.

A third embodiment of the present invention provides a factor estimation system including: the factor estimation device; a state-classification learning device configured to learn to classify states; a condition-classification learning device configured to learn to classify conditions; the state classification unit using the learning result from the state-classification learning device to classify a state; and the condition classification unit using the learning result from the condition-classification learning device to classify a condition.

According to the first embodiment, the state and condition of objects are classified, and the condition that resulted in an object entering a predetermined state is estimated on the basis of the results of classification. This allows a factor to be estimated without human intervention.

According to the second embodiment, the condition that results in an outcome is identified through referencing the history of a condition change pattern. This makes it easier to identify conditions that result in an outcome.

According to the third embodiment, the result of machine learning by the state-classification learning device and the condition-classification learning device are output to the state classification unit and the condition classification unit, respectively, whereby the state classification unit and the condition classification unit acquires the ability to classify states and conditions, respectively. The use of machine learning eliminates the need for human intervention, thereby precluding human-generated threats, such as threats to privacy and to security.

The present invention makes it possible to provide a factor estimation device, system, and method that can estimate factors that result in an outcome.

DETAILED DESCRIPTION OF THE INVENTION

An embodiment of the present invention is described below with reference to drawings.

This embodiment of the present invention relates to a factor estimation system including a factor estimation device configured to estimate a factor that results in an outcome. A factor estimation system according to the embodiment enables a machine (e.g., a computer) to learn efficiently from a large volume of data pertaining to an object and to acquire the ability to estimate factors. This embodiment uses a deep learning technique to allow for a machine to acquire the ability to classify data. Deep learning enables a machine to find similar patterns within multi-dimensional vector data. This enables the machine to classify data with a similar pattern into the same category. Teaching data cannot be created when a causal relationship is unknown. It is possible, however, to acquire a certain level of classification ability through learning with non-supervised learning data. Deep learning with non-supervised learning data helps a machine to acquire the ability to classify data, and enables the machine to determine a causal relationship yet to be known. Simple classification of input data, however, does not let a machine acquire the ability to assess a causal relationship. The following explains how a machine acquires the ability to assess a causal relationship according to this embodiment.

To facilitate understanding, an explanation is given using an example of a person as an object. An object is not limited to a person; an object may be a living organism other than a person, the behavior of a person or a living organism, an inanimate object or the activity of an inanimate object. Any thing for which a factor may be estimated from an outcome may be treated as an object.

This embodiment obtains a large volume of data on a number of people with the data pertaining to the persons themselves and to their environments; the embodiment stores the data for use as learning data. Data pertaining to each person may be obtained, for example, from the person operating a business app or a smartphone app, from an automobile control device or sensor, from a wearable sensor, or from a health check app. Data pertaining to the environment of the person may be obtained, for example, from an Internet of Things (IoT) sensor, and various other devices in the surroundings of the person.

Figure 1:
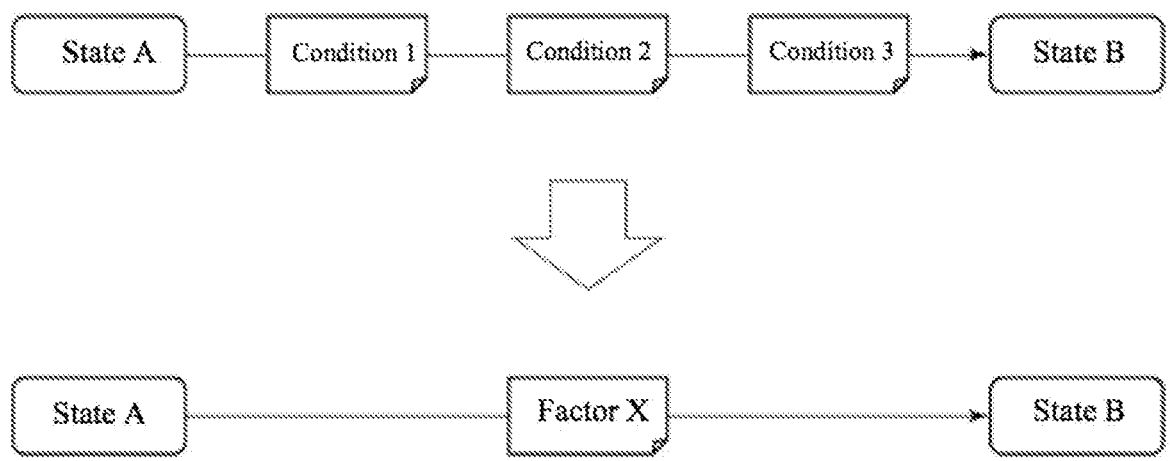
FIG. 1 is a diagram outlining a factor estimation method according to an embodiment.

FIG. 1 shows how an object is modeled in this embodiment. An object transitions from a state A to a state B according to a factor X contained in a condition or in any one of a plurality of conditions (three conditions in the example in FIG. 1). Each condition contains external and/or intrinsic factors that may result in an outcome. An external factor represents an environment that affects an object. An intrinsic factor represents a state or a behavior of an object. Each condition may contain external and/or intrinsic factors that may not result in an outcome. The problem is to estimate a factor X that results in a state change (transition) from a state A to a state B for a person, i.e., the object. Any of the conditions may be a factor resulting in a transition from a state A to a state B. Given this model, a factor X is contained in one of the conditions.

Figure 2:
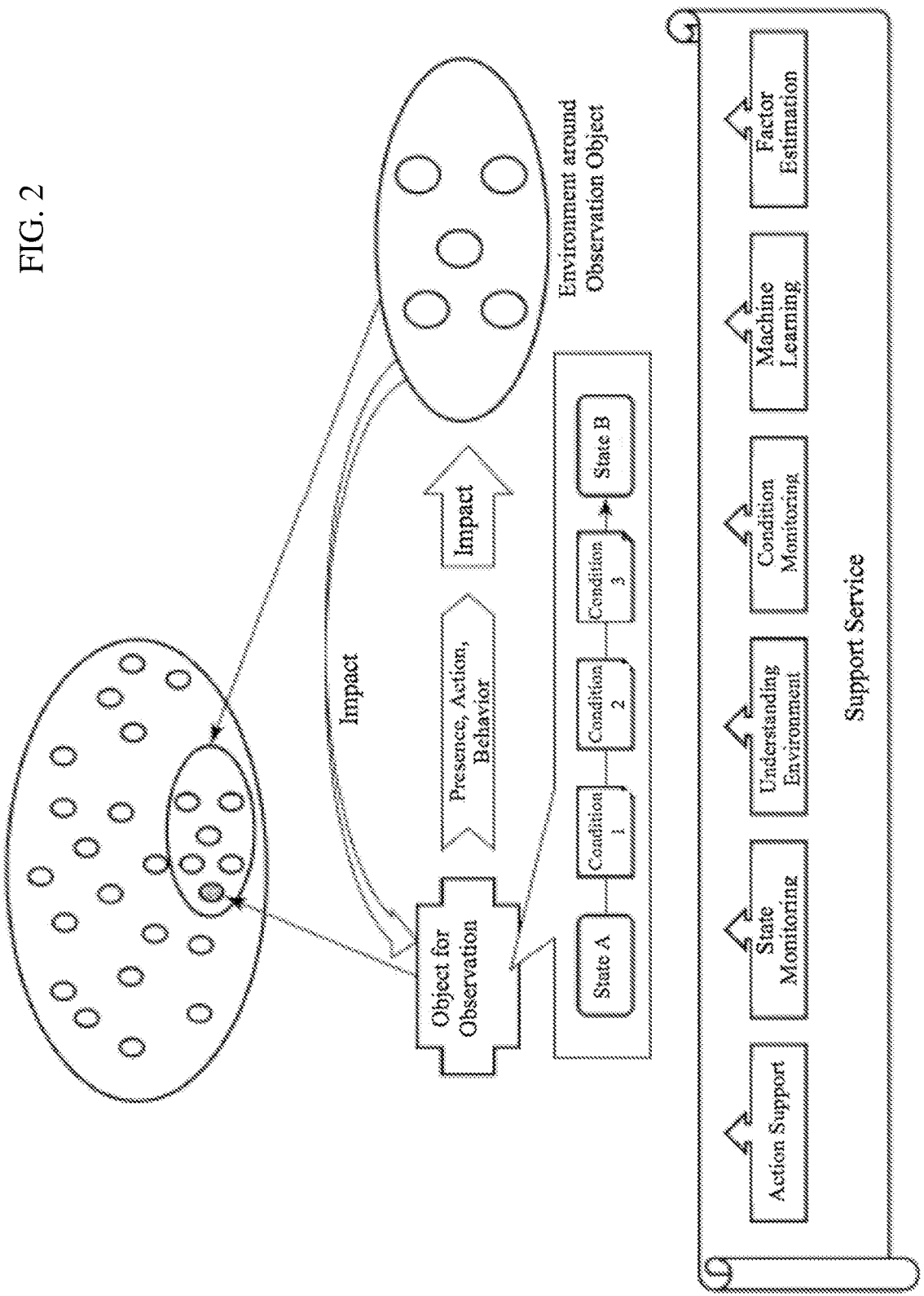
FIG. 2 is a diagram outlining a factor estimation method according to the embodiment.

Services and device functions envisioned in this embodiment are described with reference to FIG. 2. The explanation below includes elements not included in the present invention.

A user subscribes to a service (e.g., a support service) via a user terminal device (not shown). At the time of subscription, the user signs an agreement that specifies terms and conditions under which the user will receive the service. A support service enables the user to monitor the state and condition of many objects (hereinafter, also called objects for observation). A support service may be administered using an IoT system. A service request is made per object. A support service may be administered using an existing technology, such as one disclosed in Japanese Patent No. 4150965, or a newly created support app.

Japanese Patent No. 4150965 discloses a technology that outputs work instructions depending on the situation and uses operational support contents which support the work of a user to acquire information pertaining to the behavior of the user (the object) related to a business operation. A user may download operational support contents onto a smartphone or a personal computer (PC) and use the smartphone or PC to receive support while working. The system obtains information pertaining to the environment, the user, the operational state, and the like. The operational support contents also updates with use by each user, and thus each user is provided with a different service.

An object for observation and other objects in the environment surrounding the object for observation are included in a set of objects that can be monitored. An object for observation impacts its surrounding environment with its presence, behaviors, and activities. Conversely, the surrounding environment impacts the object for observation. Here, the object for observation transitions from a state A to a state B, impacting and being impacted by the environment. While the object transitions from a state A to a state B, the surrounding environment transitions from a condition 1 to a condition 2, and further to a condition 3. As stated above, the problem is to estimate a factor that results in an object transitioning from a state A to a state B. This may be achieved by performing comprehensive support services described below. Support services include functions of action support, state monitoring, understanding environment, condition monitoring, machine learning, and factor estimation.

Action support is a function that supports the action of a person who is the object. If the object is an inanimate object, action support involves supporting the operation of the object. Information pertaining to the state or condition of an object may be acquired while support is being provided. State monitoring is a function that monitors the state of an object. Understanding environment is a function that perceives the environment around the object and obtains the state of the environment and other environment-related information. Condition monitoring is a function to acquire information on an object and the environment around the object and to monitor a condition of the object. Machine learning is a function that collects information pertaining to an object and the environment around the object, creates learning data from the collected information, and carries out predefined learning. Factor estimation is a function that estimates a factor that causes an object to transition to a predetermined state B.

All support services including those described above are performed by machines. This enables more detailed service offerings for each individual object. Absence of human intervention precludes human-generated threats, such as threats to privacy and security. Additionally, when a machine provides such services, it is easier to automatically acquire information on a person's environment. Moreover, services may be provided 24 hours a day, 7 days a week without human intervention.

This embodiment includes machine learning to acquire the ability to classify data composed of multi-dimensional vectors. The ability to classify may be acquired from, for example, deep learning. It is desirable that the dimensions of the data to be classified match the dimensions of the input vector to facilitate the construction of a learning program. The ability to classify data may be acquired by methods other than deep learning. The ability to classify data may be acquired by any known methods such as Artificial Intelligence (AI) or machine learning. Learning does not necessarily involve AI technologies. Input data may be obtained, for example, through a method devised to separate multi-dimensional vector distributions by event, and learning may employ predetermined assessment logic or methods such as the Monte Carlo method or a genetic algorithm to learn threshold parameters.

Figure 3:
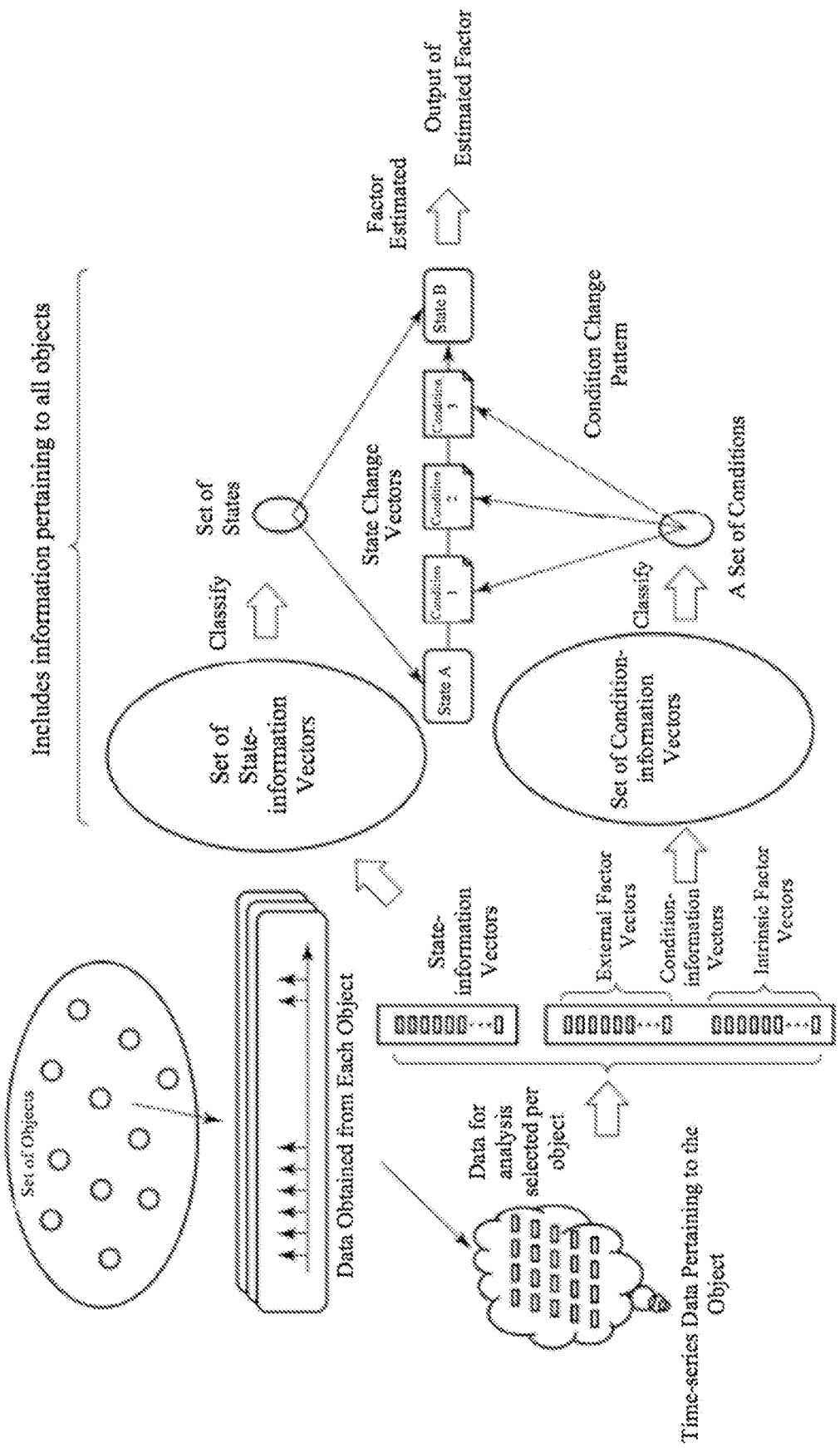
FIG. 3 is a diagram outlining a factor estimation method according to the embodiment.

The ability to estimate a factor based on a large volume of data collected on a person (the object), may be acquired as follows. FIG. 3 outlines a method of acquiring the ability to estimate factors according to this embodiment. The method includes obtaining time-series data (sensor data) on each object in an object set. When the number of objects is large and the frequency of obtaining data is high, the data obtained constitutes big data. The method includes selecting data for each object for analysis from among the data obtained on the objects. Specifically, the method includes extracting data on an object's state and using the extracted data to generate one or more data representing a state of the object, or a state-information vector, which is a combination of the generated data. A state-information vector may be expressed by a plurality of sensor data obtained for the object itself. A state-information vector includes, for example, biological data obtained by measuring human biological information (e.g., blood pressure and heart rate) and data from an action history that stores a person's actions. A set of state-information vectors is obtained through collecting data on a large number of objects at many different time points. The method, moreover, includes extracting data on the condition of the object and using the extracted data to generate condition-information vectors. A condition-information vector represents data pertaining to events that could cause an object to enter a predetermined state. Condition-information vectors include external factor vectors and intrinsic factor vectors. Both an external factor vector and an intrinsic factor vector represent one or more data or a combination thereof. Condition-information vectors ideally include both external factor vectors and intrinsic factor vectors, but do not have to include both. An action in response to an external factor, for example, may be without a voluntary element. An external factor vector may be expressed by a plurality of sensor data obtained for an object's surrounding environment. An intrinsic factor vector may be expressed by a plurality of sensor data obtained for an object itself. An intrinsic factor vector includes data that are output, for example, by wearable sensors, mobile terminals, business apps, automobiles, and other machines operated by a human. Intrinsic factor vectors may include all or part of a state-information vector. A set of condition information vectors is obtained through collecting data on a large number of objects at many different time points.

The method includes carrying out non-supervised learning to classify state-information vectors to acquire the ability to classify the state of a person. State-information vectors obtained for a large number of objects are classified into a predetermined number of state categories (e.g., ten thousand). Similar state-information vectors are classified into a same state category. Given that the ability to classify state-information vectors is acquired through learning, the method can classify the state of an object at any given time of a day. This ability is called a state classification ability. It provides a set of classified states for a large number of objects.

The method includes carrying out non-supervised learning to classify condition-information vectors to acquire the ability to classify the condition of a person. Condition information vectors obtained for a large number of objects are classified into a predetermined number of condition categories (e.g., ten thousand). Similar condition-information vectors are classified into a same condition category. Given that the ability to classify condition-information vectors is acquired through learning, the method can classify the condition of an object at any given time of a day. This ability is called a condition classification ability. It provides a set of classified conditions of a large number of objects. Learning may be designed to acquire a condition classification ability for each state of the person.

The method includes identifying prior and subsequent states for which factors are to be estimated as a state A (also called a prior state) and a state B (also called a subsequent state). For example, prior and subsequent states may be states recognized by a person (the object). If an object inputs "My arms are more fatigued now than last week," the state during the last week is identified as a prior state and the state at the time of input is identified as a subsequent state. Prior and subsequent states may be identified on the basis of information pertaining to the state of a person obtained from a wearable sensor or a smartphone. Predetermined states as assessed by an app may be used for prior and subsequent states. Prior and subsequent states may be states before and after the emergence of the current state as assessed via a predetermined method. States may be identified by any other desired method.

As shown in FIG. 1, it is required to estimate a factor X that may result in an object transitioning from a state A to a state B. Data on a large number of objects, data that represents a change from a state A to a state B, is extracted. These data represent state change vectors. Data on a large number of objects, data that represent conditions at the time of change from a state A to a state B, is extracted. These data represent a condition change pattern. If, for example, three different conditions are extracted for the period when there is a transition from a state A to a state B, the following three condition change patterns may be conjectured:

State A→Condition 1→State B
State A→Condition 2→State B
State A→Condition 3→State B Here, conditions 1, 2, and 3 are a set of conditions deemed similar by an AI as a result of the AI classifying the condition-information vectors from the time period when any one or more objects transitioned from a state A to a state B. In this example, the condition selected is made of three types of conditions, but the condition selected may be made up of one, two, four or more types of conditions. For example, if conditions 2 and 4 are detected as conditions coinciding with the time when the state of the object changes from a state A to a state B, the condition 2 is estimated to be a factor for the change.

State-information vector classification may result in three cases that involve a state change from state A to state B, with each instance of the state change having a plurality of condition-information vectors (e.g., three). For example, the following three condition change patterns could be obtained:

State A→Condition 1→Condition 4→Condition 6→State B
State A→Condition 2→Condition 3→Condition 4→State B
State A→Condition 3→Condition 5→Condition 7→State B If the classification of the condition-information vector for an object during the time the object transitions from a state A to a state B results in the detection of condition 1, condition 10, and condition 20, the condition 1 is estimated to be a factor X.

This section explains a method of acquiring the ability to estimate a factor X associated with the change from a state A to a state B. If a change from a state A to a state B happens frequently with specific people, it is possible to use data acquired about the specific people to identify a factor. If a change from a state A to a state B is commonly seen among people belonging to a specific category, it is possible to use more data acquired about the people of the specific category to identify a factor. Any data is extracted that includes a state A and a state B in this sequence for all objects. These data represent state change vectors. Condition data during the time of transition from a state A to a state B are extracted. These data represent condition transition lists. State change vectors and condition transition lists are combined to serve as learning data for factor estimation. These data represent condition change patterns. The learning data includes data pertaining to a large number of people and represents the conditions at the time of a state change from a state A to a state B. If a plurality of conditions exists during the time of a state change from a state A to a state B, a new learning data, excluding information pertaining to irrelevant conditions, may be generated. Since the states and the conditions have been classified, their respective data volume is significantly smaller than their original data volume. This enables more efficient learning. The following describes how to acquire the ability to identify the similarity of conditions, which is needed for estimating a condition which may cause the state of a person to change from a state A to a state B. This ability acquired may classify data for learning factor estimation into 1,000 categories. For example, the ability acquired may classify the data of a large number of people into a predetermined number of (e.g., 1,000) categories, where the data represents conditions during the time of the state of a person changing from a state A to a state B. Similar data from among a set of data representing conditions during the time of the state of a person changes from a state A to a state B, are classified into a single category.

The method includes acquiring an ability to classify irrelevant conditions. More specifically, the method includes extracting data associated with an object being in a state A followed by a state B, and data associated with an object being in a state A but not followed by a state B. These data may be used to create teaching data to classify less relevant conditions. Excluding less relevant conditions reduces the volume of data processed and enables faster determination of contributing factors. Excluding less relevant conditions can also keep irrelevant events from generating unnecessary categories for condition classification.

The process described above may be performed per object type or attribute. For example, people may be classified by attributes such as sex, age, and physical strength.

Figure 4:
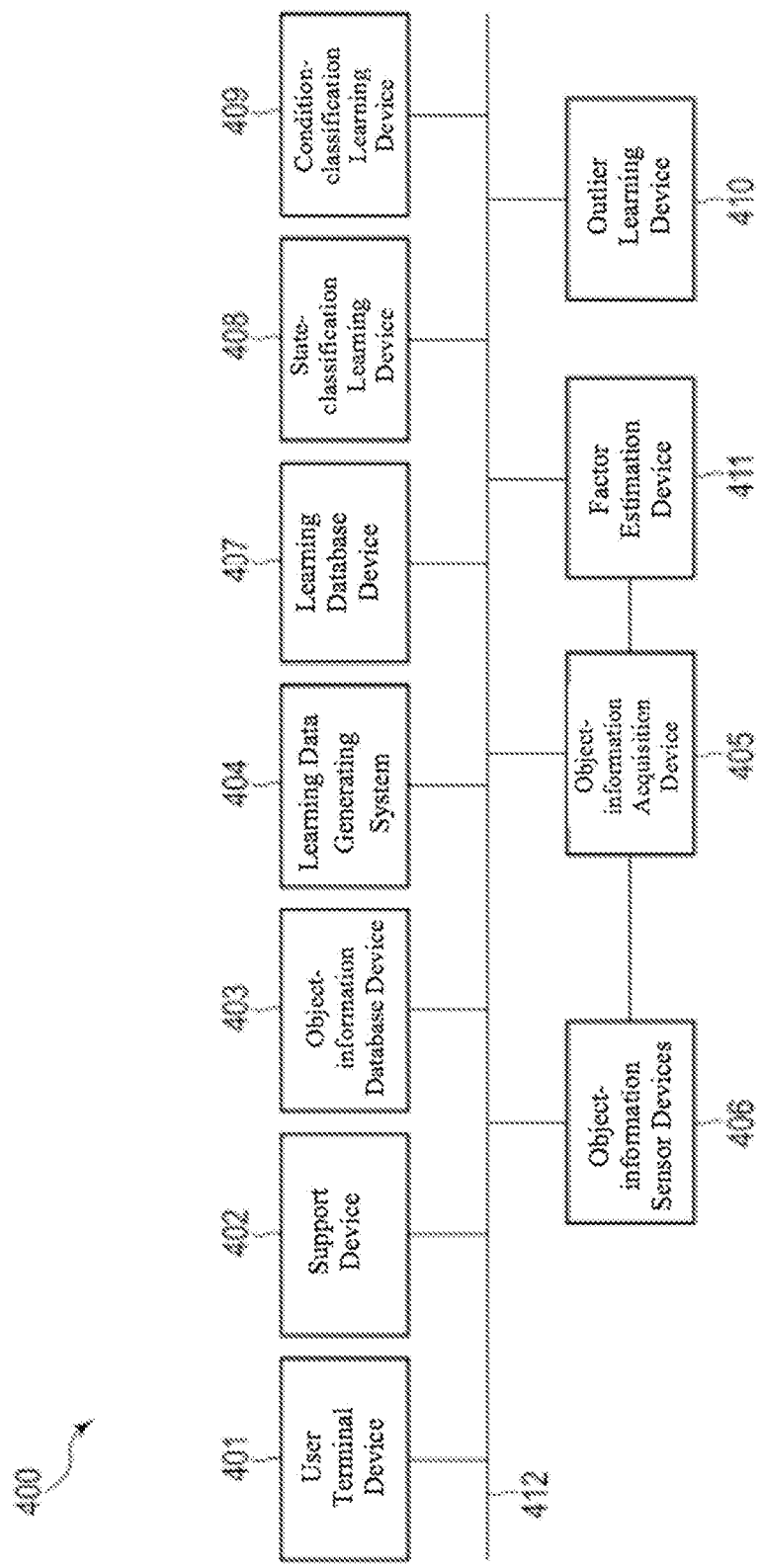
FIG. 4 is a block diagram illustrating a configuration of a factor estimation system according to the embodiment.

FIG. 4 illustrates a configuration of a factor estimation system according to an embodiment. The factor estimation system 400 shown in FIG. 4 includes a user terminal device 401, a support device 402, an object-information database device 403, a learning data generating system 404, an object-information acquisition device 405, an object-information sensor device 406, a learning database device 407, a state-classification learning device 408, a condition-classification learning device 409, an outlier learning device 410, and a factor estimation device 411, all of which are connected to a network 412, e.g., the internet. In the example depicted in FIG. 4, the factor estimation system 400 has a configuration designed for a distributed system such as a data center or a cloud system. The factor estimation system 400 may be implemented as one device. For example, a computer connected to sensor devices may be used to implement the factor estimation system 400. A plurality of devices within the factor estimation system 400 may be implemented by one device. For example, the state-classification learning device 408, condition-classification learning device 409, and the outlier learning device 410 may be implemented by one computer. The system may also be modified by relocating some elements within any of the devices to another device. Moreover, any of the devices may be further distributed to facilitate parallel operation.

The user terminal device 401 provides support services to users. For example, the following devices may serve as the user terminal device 401: a personal computer (PC), a smartphone, a smart watch, a wearable device, a home appliance, a health device, a medical device, a business operational terminal, a public terminal, an audio terminal, an automobile console, a head-up display, an automobile control device, a telematics terminal, a plant operation support device, and a business terminal for a specific task such as an automated teller machine (ATM) and a ticket sales machine. Any other devices that are at least capable of outputting the result of factor estimation may serve as the user terminal device 401. The user terminal device 401 may be one of the functions that constitute, for example, a cloud service or an Internet of Things (IoT) service.

Users have access to a support app (also referred to as a support program or support contents) at the user terminal device 401. Support apps may be provided per support target or purpose. Support apps provide support services in coordination with a support program running on the support device 402.

Users use the user terminal device 401 to request a support service, such as to monitor an object. The user terminal device 401 sends a support request message, which includes information on a monitoring method, to the support device 402.

Using the user terminal device 401, users can request factor estimation by designating an object and a resulting state (a state B) caused by certain factors. Users may designate two states (states A and B). For example, the user terminal device 401 may display a plurality of states in chronological order, and the user selects two states out of the displayed states. Alternatively, a user may designate two different time points (date and time). The state A may be defined as a state immediately preceding a state B. In this case, the user only designates a state B. The user may set criteria in advance for detecting states A and B. The state A may be defined as an initial state. The states A and B may be determined from the information the user enters into the user terminal device 401. For example, assume a user inputs "I am sleepy today although I wasn't sleepy until the day before yesterday." In this case, the support app designates a state at any time on the day before yesterday as the state A and the current state as the state B. Alternatively, the support app may detect a drastic change in the state of the object and designate a pre-change state as a state A and a post-change state as the state B. Alternatively, the support app may detect a significant variation in the performance of an object (e.g., the work performance) and designate a state prior to the variation as the state A and a state subsequent to the variation as the state B. The user terminal device 401 sends information for identifying states A and B to the support device 402.

The user terminal device 401 may provide the function of the object-information acquisition device 405. The user terminal device 401 may also provide a sensor function. If the user terminal device 401 has a high processing capacity, the user terminal device 401 may provide the function of the factor estimation device 411.

Figure 5:
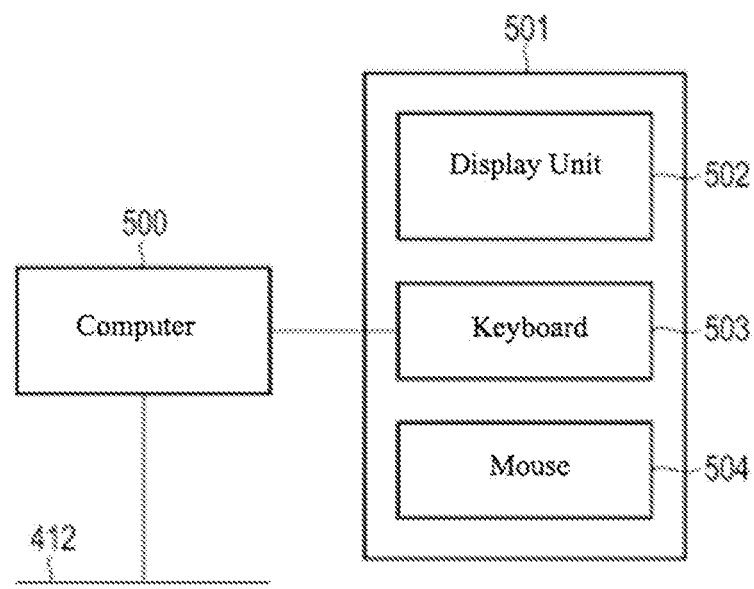
FIG. 5 is a block diagram illustrating a hardware configuration of a computer.

FIG. 5 illustrates a hardware configuration of a computer that serves as the user terminal device 401. A computer 500 shown in FIG. 5 includes a user interface 501. The user interface 501 receives an instruction (e.g., a request for factor estimation) from a user, and outputs information (e.g., a factor estimation result) to the user. In the example depicted in FIG. 5, the user interface 501 includes a display device 501, a keyboard 503 and a mouse 504. In another example, the user interface 501 includes a touch screen. The computer also includes a central processing unit (CPU), a memory, and a communication unit (none of these are shown). The memory includes, for example, read-only memory (ROM), random-access memory (RAM), and a storage device. The storage device may be served by, for example, a hard drive (HDD). A CPU may read the various programs residing in the ROM or the storage device to the RAM and run the programs to implement the variety of functions of the user terminal device 401. The communication unit includes an interface to connect to the network 412.

The support device 402 may be implemented, for example, by a support program running on a server computer. A support program may be implemented, for example, as a web app. Users can use a web app via a browser on the user terminal device 401. A support program may be run on the user terminal device 401 using representational state transfer (REST) or the like. The support device 402 may provide the function of the object-information database device 403.

Figure 6:
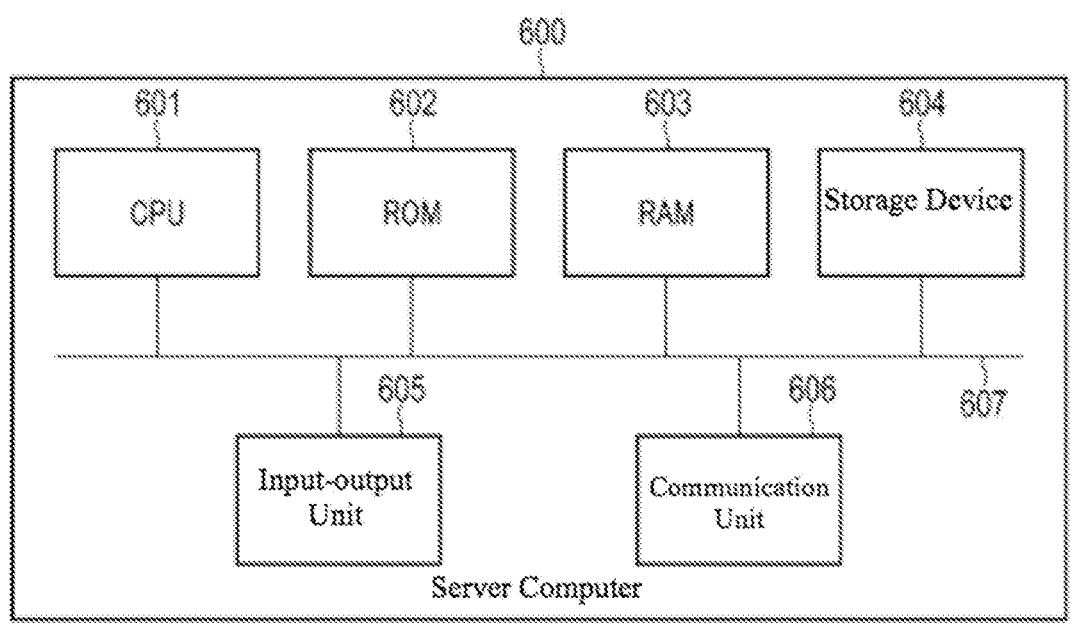
FIG. 6 is a block diagram illustrating a hardware configuration of a server computer.

FIG. 6 illustrates a hardware configuration of a server computer. The support device 402, the object-information database device 403, each device in the learning data generating system 404, the object-information acquisition device 405, or the learning database device 407, for example, may be implemented by the server computer 600 shown in FIG. 6.

The computer 600 includes a CPU 601, a ROM 602, a RAM 603, a storage device 604, an input-output unit 605 and a communication unit 606, each of which are interconnected via a bus 607. The CPU 601 may read the various programs residing in the ROM 602 or the storage device 604 to the RAM 603 and perform a variety of functions of the devices such as the support device 402 by running the programs. For the storage device 604, for example, a hard drive (HDD) may be used. The input-output unit 605 inputs information and outputs information. An example of the input-output unit 605 includes a display device, a keyboard, and a mouse. The communication unit 606 includes an interface to connect to a network (e.g., the network 412 in FIG. 4).

Figure 7:
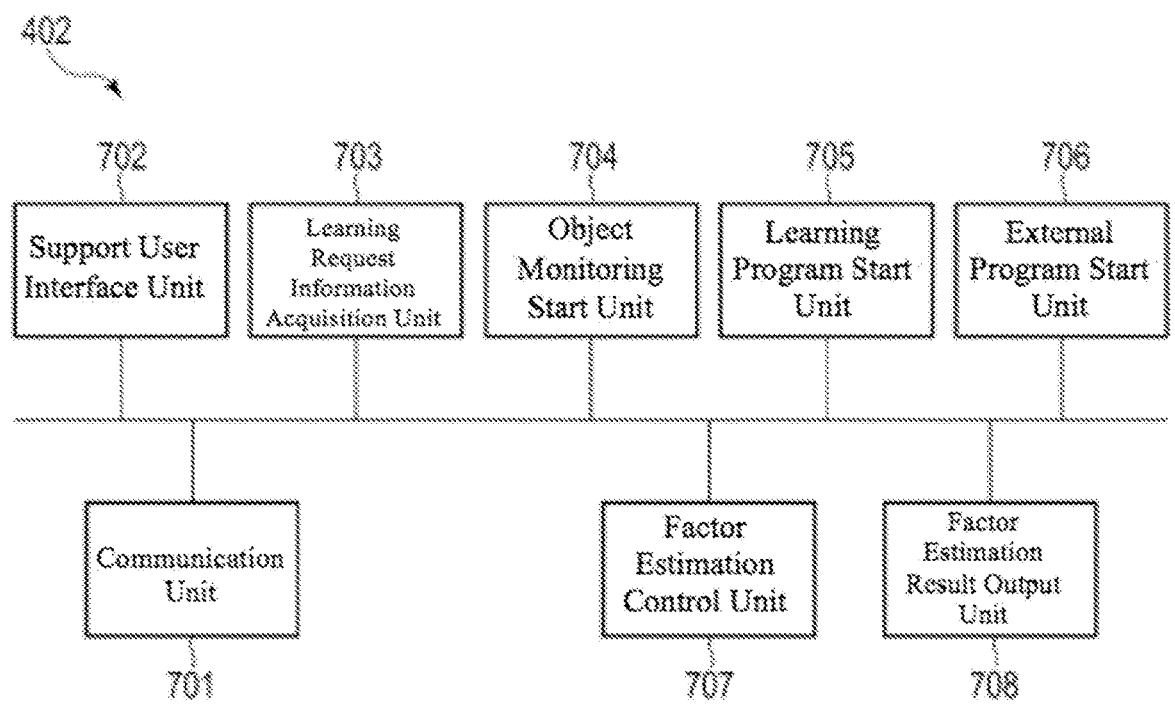
FIG. 7 is a functional block diagram illustrating a configuration of a support device shown in FIG. 4.

FIG. 7 is a functional block diagram illustrating a configuration of the support device 402. The support device 402 shown in FIG. 7 includes a communication unit 701, a support user interface unit 702, a learning request information acquisition unit 703, an object monitoring start unit 704, a learning program start unit 705, an external program start unit 706, a factor estimation control unit 707, and a factor estimation result output unit 708. The communication unit 701 exchanges data with other devices connected therewith through the network 412.

The support user interface unit 702 provides a user interface for a support program. The support user interface unit 702 enables users to subscribe to support services. For example, the support user interface unit 702 receives a request for support from a user. Alternatively, the support user interface unit 702 may receive a request for factor estimation from a user. Alternatively, the support user interface unit 702 may receive the parameters for a state detection.

The learning request information acquisition unit 703 receives, through the support user interface unit 702, a request to acquire the ability to estimate a factor. More specifically, the learning request information acquisition unit 703 acquires information to identify states A and B. The learning request information acquisition unit 703 may receive a request for learning for a purpose other than factor estimation.

The object monitoring start unit 704 sends a command to the object-information acquisition device 405 for the object-information acquisition device 405 to start monitoring an object designated by a user. A command to start monitoring is sent for each object.

The learning program start unit 705 sends a command to respective devices to start an applicable program. For example, the learning program start unit 705 sends a command to the object-information sensor device 406 to start a monitoring program to monitor objects. A monitoring program is started in one or more sensor devices included in the object-information sensor device 406 to perform monitoring appropriate to the object. The learning program start unit 705 sends to the learning data generating system 404 a command to start a learning data generation program to generate learning data. Further, the learning program start unit 705 sends a command to start a learning program. For example, the learning program start unit 705 sends a command to start a state-classification learning program to the state-classification learning device 408, a command to start a condition-classification learning program to the condition-classification learning device 409 and a command to start an outlier learning program to the outlier learning device 410.

The external program start unit 706 starts a program on an external device as needed in order to respond to a request from the user. The external program start unit 706, for example, can start a surveillance camera in the room where the object is present. The external program start unit 706 can start an operational support app that supports specific business operations. The external program start unit 706 can play fitness support contents for users.

The factor estimation control unit 707 controls the factor estimation device 411. The factor estimation control unit 707 applies the results of learning generated by the state-classification learning device 408, the condition-classification learning device 409, and the outlier learning device 410 to the factor estimation device 411 to make the learning results available for use. More specifically, the factor estimation control unit 707 configures a neural network for the factor estimation device 411 according to the learning results. The factor estimation control unit 707 receives information for identifying states A and B from the user terminal device 401, and sends a command to perform factor estimation to the factor estimation device 411. Subsequently, the factor estimation control unit 707 receives the results of estimation from the factor estimation device 411, and relays the results to the factor estimation result output unit 708. The factor estimation result output unit 708 receives the results of estimation from the factor estimation control unit 707 and sends the results to the user terminal device 401.

The object-information database device 403 stores data pertaining to an object acquired by a sensor device, which acquires information on the object according to a command from the object-information acquisition device 405. The object-information database device 403 stores data so that the data can be extracted to generate state-information vectors and condition-information vectors pertaining to a designated object.

Figure 8:
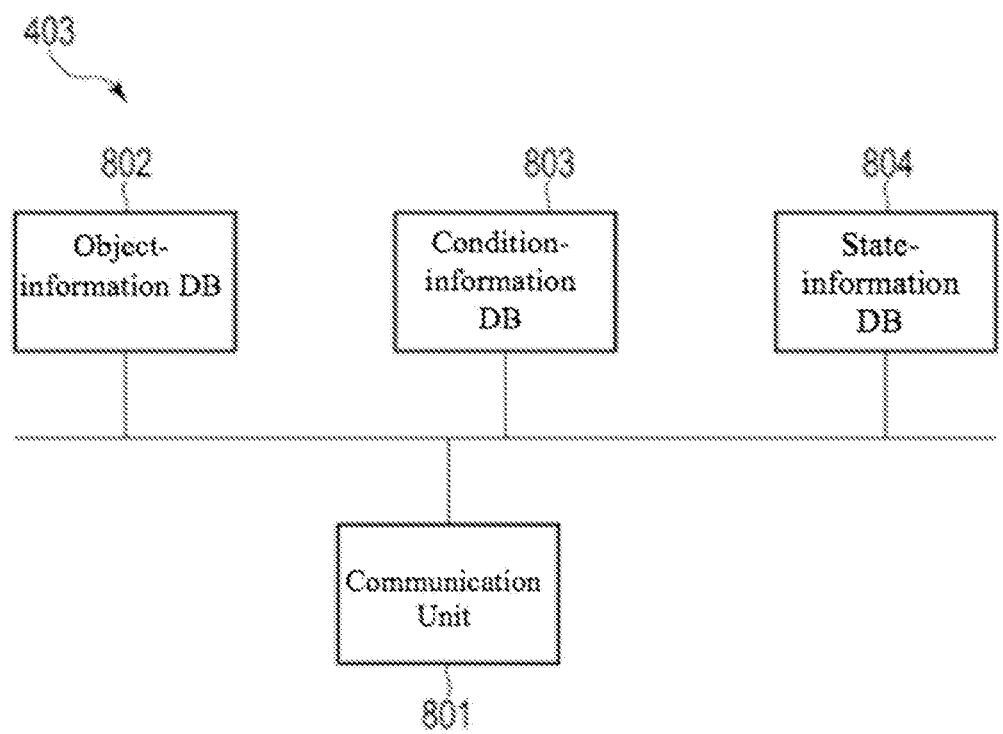
FIG. 8 is a functional block diagram illustrating a configuration of the object-information database device shown in FIG. 4.

FIG. 8 is a functional block diagram showing a configuration of the object-information database device 403. The object-information database device 403 shown in FIG. 8 includes a communication unit 801, an object-information database (DB) 802, a state-information DB 803, and a condition-information DB 804. The communication unit 801 exchanges data with other devices it is connected with through the network 412. The object-information DB 802 stores data pertaining to an object acquired by the object-information acquisition device 405. The state-information DB 803 stores state data that has been extracted from the data stored in the object-information DB 802. The condition-information DB 804 stores condition data that has been extracted from the data stored in the object-information DB 802.

The learning data generating system 404 generates data for learning based on the object data that have been acquired by the object-information acquisition device 405 and subsequently stored in the object-information database device 403. A learning data generating system 404, for example, acquires data pertaining to an object from the object-information database device 403 and uses the acquired data to generate data for learning. Because there may be a plurality of objects, the learning data generating system 404 needs to extract state information, condition information, and excludable information per object.

Figure 9:
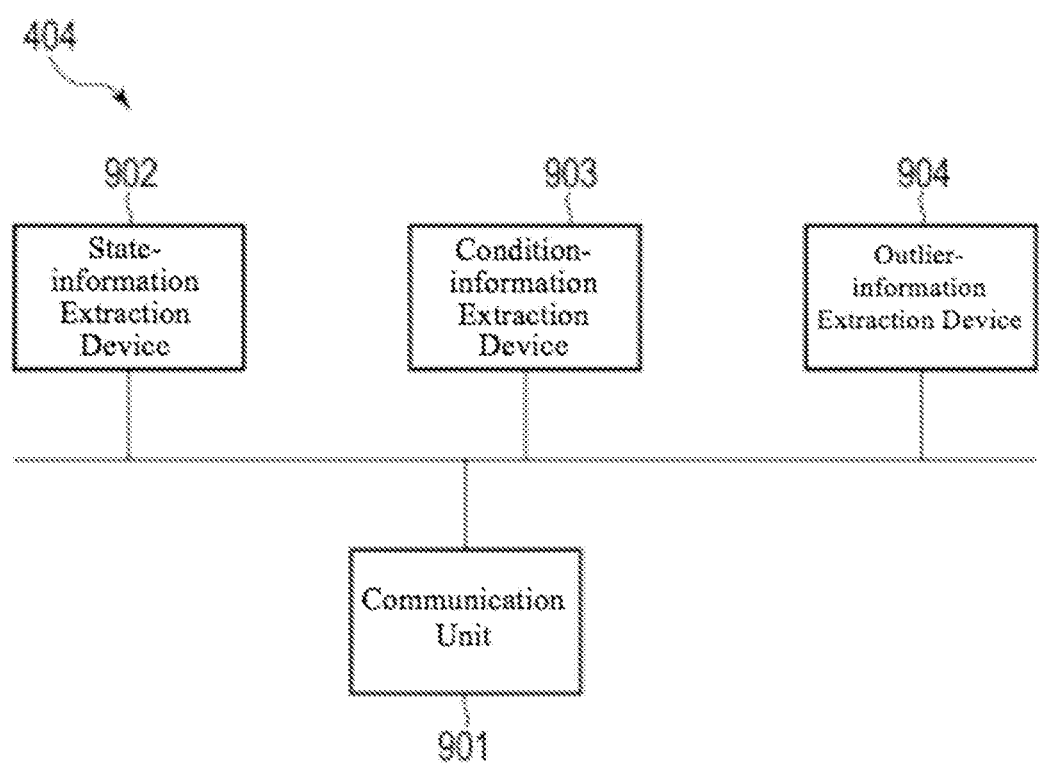
FIG. 9 is a block diagram illustrating a configuration of a learning data generating system.

FIG. 9 shows a configuration of the learning data generating system 404. The learning data generating system shown in FIG. 9 includes a communication unit 901, a state-information extraction device 902, a condition-information extraction device 903 and an outlier-information extraction device 904. The communication unit 901, the state-information extraction device 902, the condition-information extraction device 903, and the outlier-information extraction device 904 may be implemented in one device.

The communication unit 901, the state-information extraction device 902, the condition-information extraction device 903 and the outlier-information extraction device 904 are connected to a network such as Ethernet (registered trademark). The communication unit 901 exchanges data with other devices connected therewith through a network (e.g., the network 412).

The state-information extraction device 902 extracts information pertaining to an object's state from data pertaining to the object. The data extracted is output as data for learning to acquire an ability to classify states. The condition-information extraction device 903 extracts information pertaining to an object's condition from data pertaining to the object. The data extracted is output as data for learning to acquire an ability to classify conditions. The outlier-information extraction device 904 extracts information pertaining to outliers from data pertaining to an object. The data extracted is output as data for learning so the system may acquire the ability to exclude certain condition information.

Figure 10:
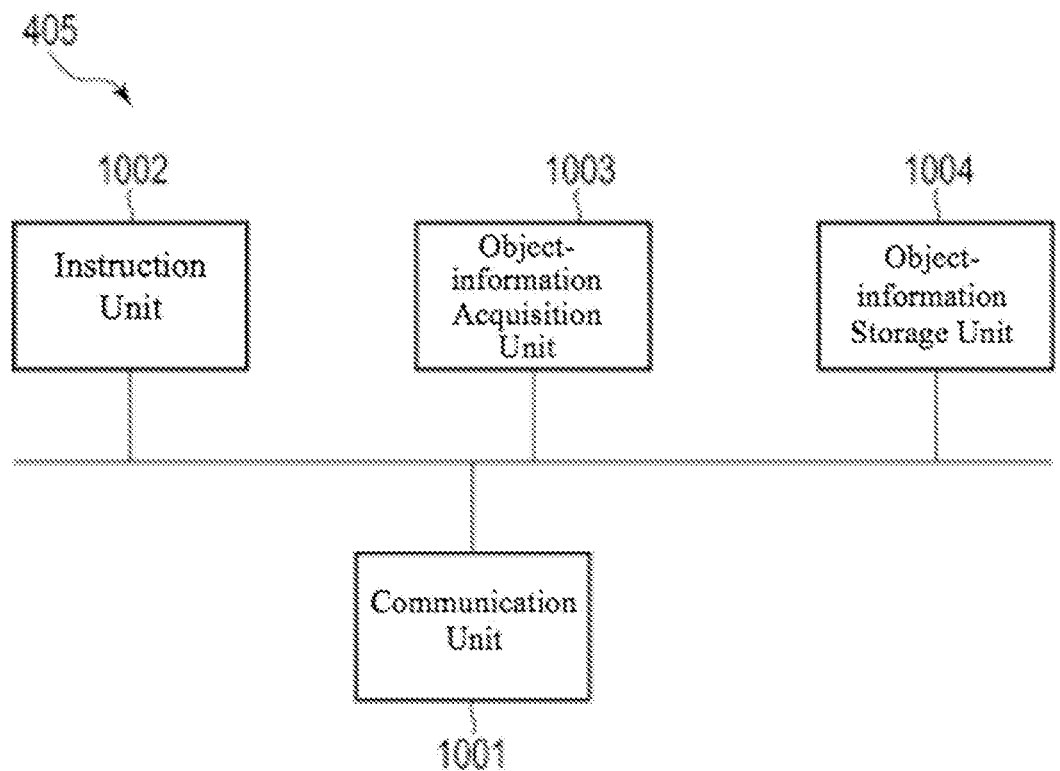
FIG. 10 is a functional block diagram illustrating a configuration of the object-information acquisition device shown in FIG. 4.

FIG. 10 is a functional block diagram illustrating a configuration of the object-information acquisition device 405. The object-information acquisition device 405 shown in FIG. 10 includes a communication unit 1001, an instruction unit 1002, an object-information acquisition unit 1003, and an object-information storage unit 1004. The communication unit 1001 exchanges data with other devices connected therewith through the network 412. The instruction unit 1002 receives a command to start monitoring an object from the support device 402, and instructs the object-information sensor devices 406 to start monitoring the object and to store data acquired thereby in the object-information database device 403. The instruction unit 1002 may control the information that is acquired per object. This allows extraction of desired information from data stored in the object-information database device 403. The instruction unit 1002 may employ different monitoring methods depending on a state of an object. Once a certain state of an object is detected, the instruction unit 1002 may instruct the object-information sensor devices 406 to select a specific sensor to monitor information pertaining to the object. The object-information acquisition unit 1003 can acquire data output from the object-information sensor devices for an object and store the acquired data in the object-information storage unit 1004.

The object-information sensor device 406 includes a plurality of sensor devices. Each sensor device detects information pertaining to an object and outputs sensor data. Sensor devices may take any form so long as they are capable of acquiring information on an object. A sensor device may be substituted by a sensor function in a device installed for another purpose. For instance, a sensor provided by a smartphone or an automobile may be utilized. Information detected by an application running on a PC or a smartphone may be utilized as sensor data. A sensor device may be implemented, for example, as a sensor dedicated to acquire specific information. Sensor devices may be sensors distributed through an IoT system. Sensor devices may be virtual sensors virtually configured on a cloud to operate like physical sensors. Data acquired by the sensor devices are stored in the object-information database device 403.

Figure 11:
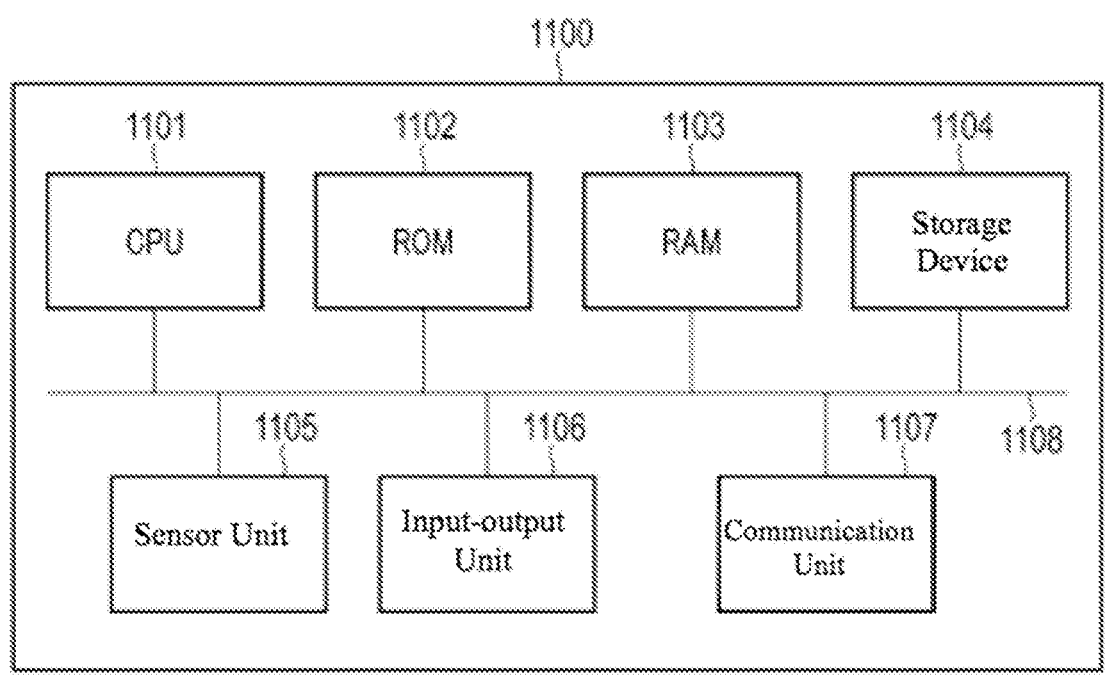
FIG. 11 is a block diagram illustrating a configuration of one of the object-information sensor devices shown in FIG. 4.

FIG. 11 illustrates a configuration of a sensor device. More specifically, FIG. 11 illustrates a computer 1100 in which a sensor device is embedded. The computer 1100 includes a CPU 1101, a ROM 1102, a RAM 1103, a storage device 1104, a sensor unit 1105, an input-output unit 1106, and a communication unit 1107, each of which are interconnected via a bus 1108. The sensor unit 1105 includes one or more sensor devices. The CPU 1101 controls the operation of the sensor unit 1105 according to a control program stored in the ROM 1102 or the storage device 1104. The input-output unit 1106 inputs information and outputs information. The communication unit 1107 includes an interface to connect to a network (e.g., the network 412 in FIG. 4).

The learning database device 407 stores data for learning generated by the learning data generating system 404. The data for learning includes data for learning state classification, data for learning condition classification, and data for learning outliers, which are used respectively by the state-classification learning device 408, the condition-classification learning device 409, and the outlier learning device 410. The learning database device 407 can sequentially output state-information vectors and condition-information vectors pertaining to a plurality of objects included in data for learning. The learning database device 407 can also sequentially output state-information vectors and condition-information vectors pertaining to a specific object or objects included in data for learning. This enables learning by using solely the data pertaining to a specific object or objects.

The learning database device 407 may be configured to store data for learning by object type or attribute. This enables handling of a plurality of object types. This also enables the extraction of desired data by designating types or attributes.

The learning database device 407 may store the results of learning generated by the state-classification learning device 408, the condition-classification learning device 409, and the outlier learning device 410.

Figure 12:
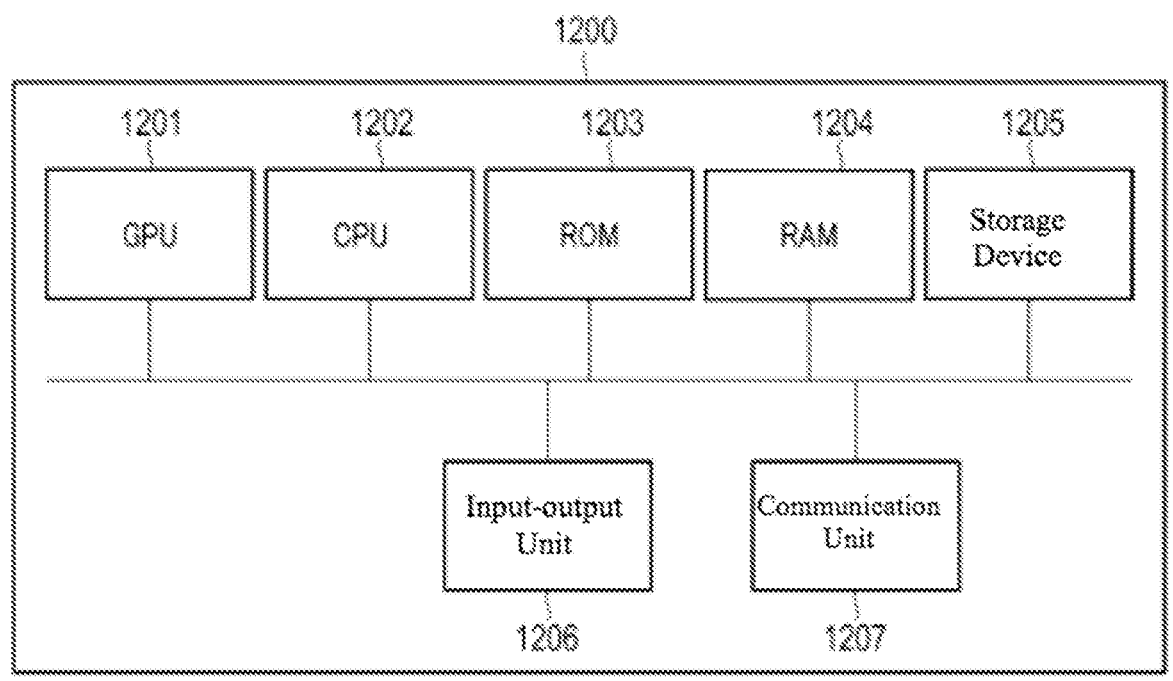
FIG. 12 is a block diagram illustrating another hardware configuration of a server computer.

The state-classification learning device 408 learns to classify states. FIG. 12 illustrates a configuration of a server computer that serves as the state-classification learning device 408. The server computer 1200 shown in FIG. 12 includes a graphics processing unit (GPU) 1201, a CPU 1202, a ROM 1203, a RAM 1204, a storage device 1205, an input-output unit 1206 and a communication unit 1207. The state-classification learning device 408 can process a large volume of data. For this reason, the computer 1200 is made up of the GPU 1201 added to an ordinary computer. As the CPU 1202, the ROM 1203, the RAM 1204, the storage device 1205, the input-output unit 1206, and the communication unit 1207 correspond respectively to the CPU 601, the ROM 602, the RAM 603, the storage device 604, the input-output unit 605, and the communication unit 606; thus, the descriptions therefor are omitted. The GPU 1201 can perform repetitive calculations for neural network learning faster than the CPU 1202.

The state-classification learning device 408 may be implemented by a blade PC, or a combination of multiple computers that are configured similarly to the computer 1200. Alternatively, the state-classification learning device 408 may be implemented by a combined server device that has a plurality of blade PCs. For processing an even larger volume of data for learning, the state-classification learning device 408 may be implemented through a data center that has a plurality of combined server devices. FIG. 12 illustrates a configuration for deep learning via software. All or part of the software processing may be performed by hardware as this speeds up processing.

Figure 13:
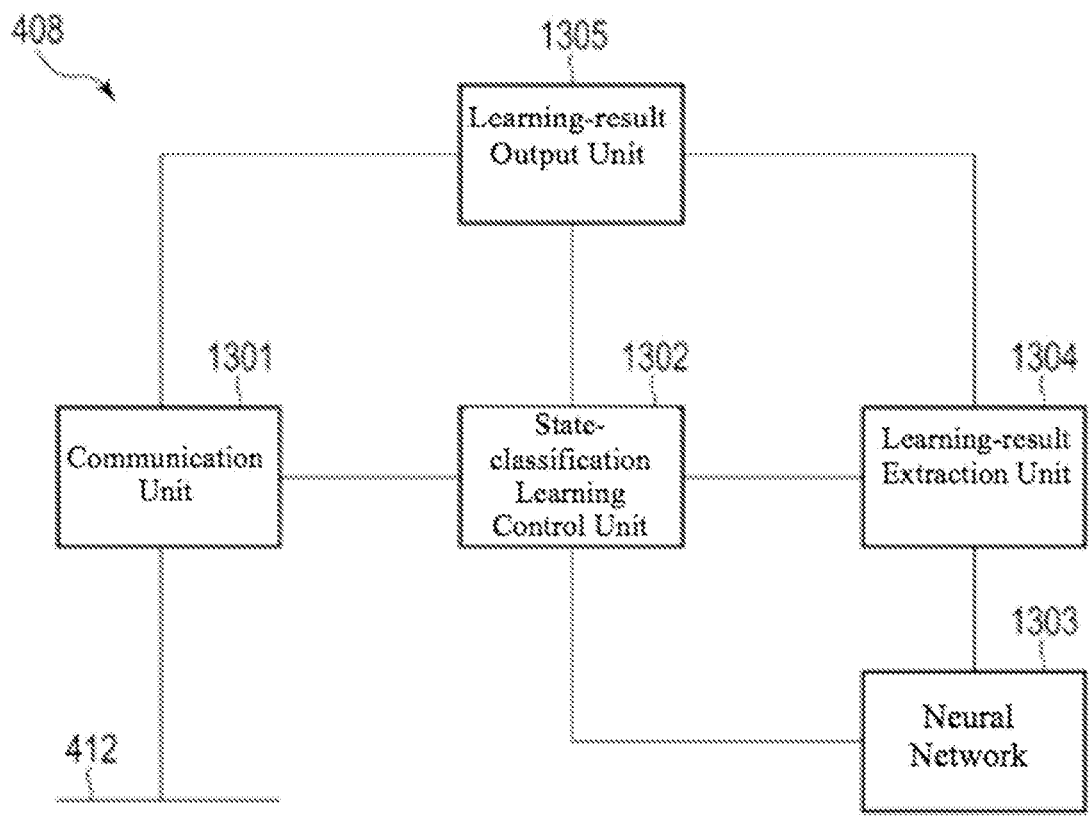
FIG. 13 is a functional block diagram illustrating a configuration of the state-classification learning device shown in FIG. 4.

FIG. 13 is a functional block diagram illustrating a configuration of the state-classification learning device 408. The state-classification learning device 408 shown in FIG. 13 includes a communication unit 1301, a state-classification learning control unit 1302, a neural network 1303, a learning result extraction unit 1304, and a learning result output unit 1305. The communication unit 1301 exchanges data with other devices connected therewith through the network 412.

The state-classification learning control unit 1302 controls the processing for acquiring the ability to classify states. The state-classification learning control unit 1302 establishes hyperparameters for the neural network 1303 and learns through deep learning. The learning performed by the state-classification learning control unit 1302 is not limited to deep learning; the state-classification learning control unit 1302 can use any method of machine learning. The state-classification learning control unit 1302 extracts data on one or more objects from data stored in the object-information DB 802 in the object-information database device 403. This embodiment uses at least the data that pertains to a designated object. Data pertaining to one or more other objects may also be used. This is particularly helpful when the data on a designated object is limited. The state-classification learning control unit 1302 selects the state-information vectors shown in FIG. 3 from the extracted data. A program for selecting the state-information vectors may be prepared in advance per object type or attribute. A state-information vector may be designed to represent a state of an object. A state-information vector may be defined by object type or attribute. The state-classification learning control unit 1302 provides the neural network 1303 with data for learning including a large number of state-information vectors, so that the neural network 1303 learns to classify the large number of the state-information vectors into a predetermined number of state categories (e.g., 10,000). The learning results in the ability to classify states. The learning result extraction unit 1304 extracts the learning result to allow the ability acquired to be implemented in other devices. The extracted information is compiled into a file or the like and sent to the factor estimation device 411 by the learning result output unit 1305.

Figure 14:
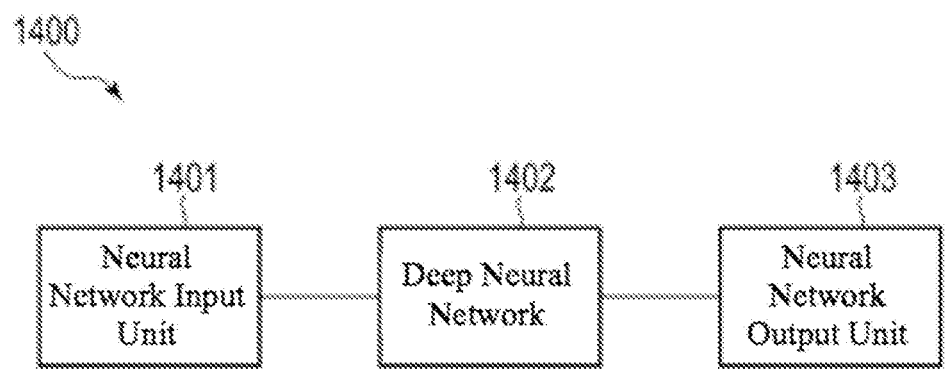
FIG. 14 is a functional block diagram illustrating a configuration of a neural network.

FIG. 14 illustrates a configuration of a neural network. A neural network 1400 shown in FIG. 14 corresponds to the neural network 1303 shown in FIG. 13. The neural network 1400 includes a neural network input unit 1401, a deep neural network 1402, and a neural network output unit 1403. Deep learning uses the deep neural network 1402. The neural network input unit 1401 enters the data for learning into the deep neural network 1402. The deep neural network 1402 uses the data to learn. The learning results in an ability to classify states. The neural network output unit 1403 outputs data from which the learning results may be extracted to allow the ability acquired to be implemented in other devices.

The condition-classification learning device 409 learns to classify conditions. The condition-classification learning device 409 may have a hardware configuration similar to that of the state-classification learning device 408. The condition-classification learning device 409 may be implemented by the server computer 1200 shown in FIG. 12, for example.

Figure 15:
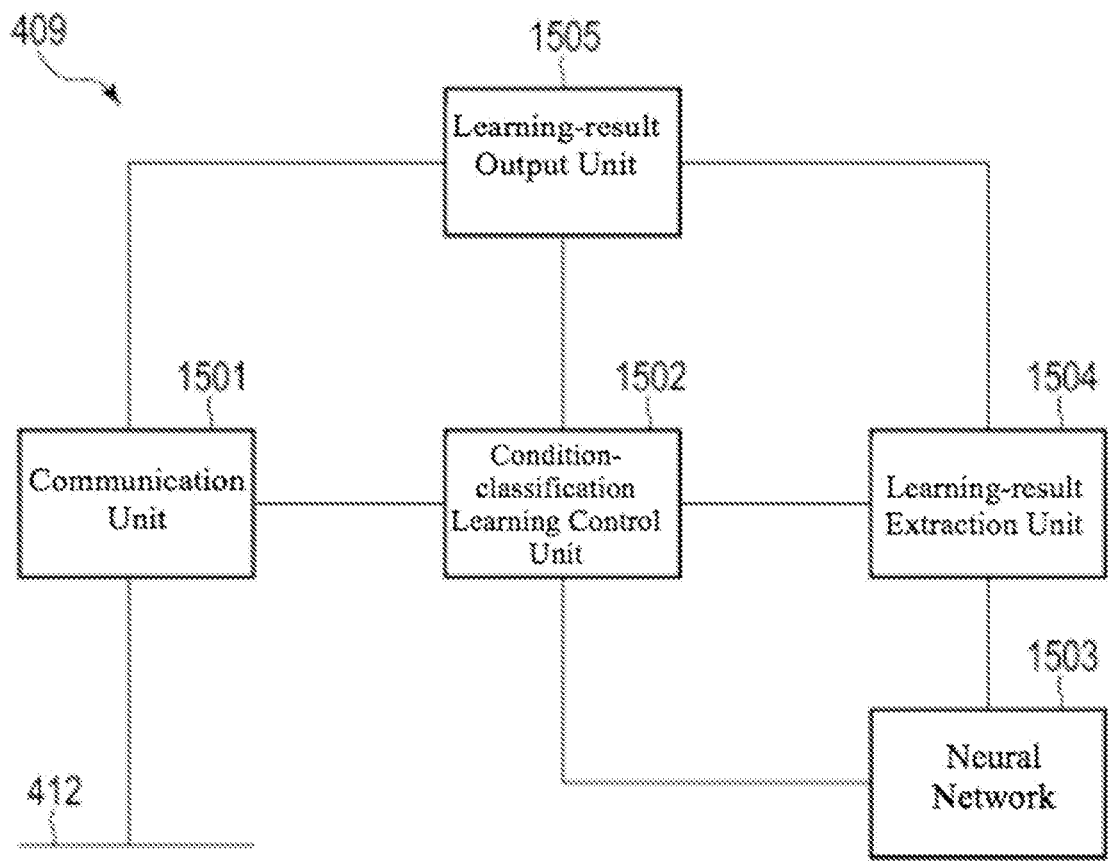
FIG. 15 is a functional block diagram illustrating a configuration of the condition-classification learning device shown in FIG. 4.

FIG. 15 is a functional block diagram illustrating a configuration of the condition-classification learning device 409. The condition-classification learning device 409 shown in FIG. 15 includes a communication unit 1501, a condition-classification learning control unit 1502, a neural network 1503, a learning result extraction unit 1504, and a learning result output unit 1505. The communication unit 1501 exchanges data with other devices connected therewith through the network 412.

The condition-classification learning control unit 1502 controls the processing for acquiring the ability to classify conditions. The condition-classification learning control unit 1502 establishes hyperparameters for the neural network 1503 and learns through deep learning. The neural network 1503 may have a configuration similar to that of the neural network 1400 shown in FIG. 14. The learning performed by the neural network 1503 is not limited to deep learning; the neural network 1503 can use any method of machine learning.

The condition-classification learning control unit 1502 extracts data pertaining to one or more objects from data stored in the object-information DB 802 in the object-information database device 403. This embodiment uses at least the data that pertains to an object designated by a factor estimation request. Data pertaining to one or more other objects may be used as well. This is particularly helpful when the data on a designated object is limited. The condition-classification learning control unit 1502 selects the condition-information vectors shown in FIG. 3 from the extracted data. The program for selecting the same may be prepared in advance per object type or attribute. A condition-information vector may be designed to represent a condition for an object. Condition-information vectors include external factor vectors and intrinsic factor vectors. An external factor vector represents an external factor that influences an object. An intrinsic factor vector represents a factor intrinsic to an object itself. A condition-information vector may be defined, for example, as a combination of external factor vectors and intrinsic factor vectors. A condition-information vector may also be defined by object type or attribute. The condition-classification learning control unit 1502 provides the neural network 1503 with data for learning including a large number of condition-information vectors, so that the neural network 1503 learns to classify the large number of the condition-information vectors into a predetermined number of condition categories (e.g., 10,000). The learning results in the ability to classify conditions. The learning result extraction unit 1504 extracts the learning result to allow the ability acquired to be implemented in other devices. The information extracted by the learning result extraction unit 1504 is compiled into a file or the like and sent to the factor estimation device 411 by the learning result output unit 1505.

The outlier learning device 410 learns to classify conditions to be excluded. The outlier learning device 410 may have a hardware configuration similar to that of the state-classification learning device 408. The outlier learning device 410 may be implemented, for example, by the server computer 1200 shown in FIG. 12.

Figure 16:
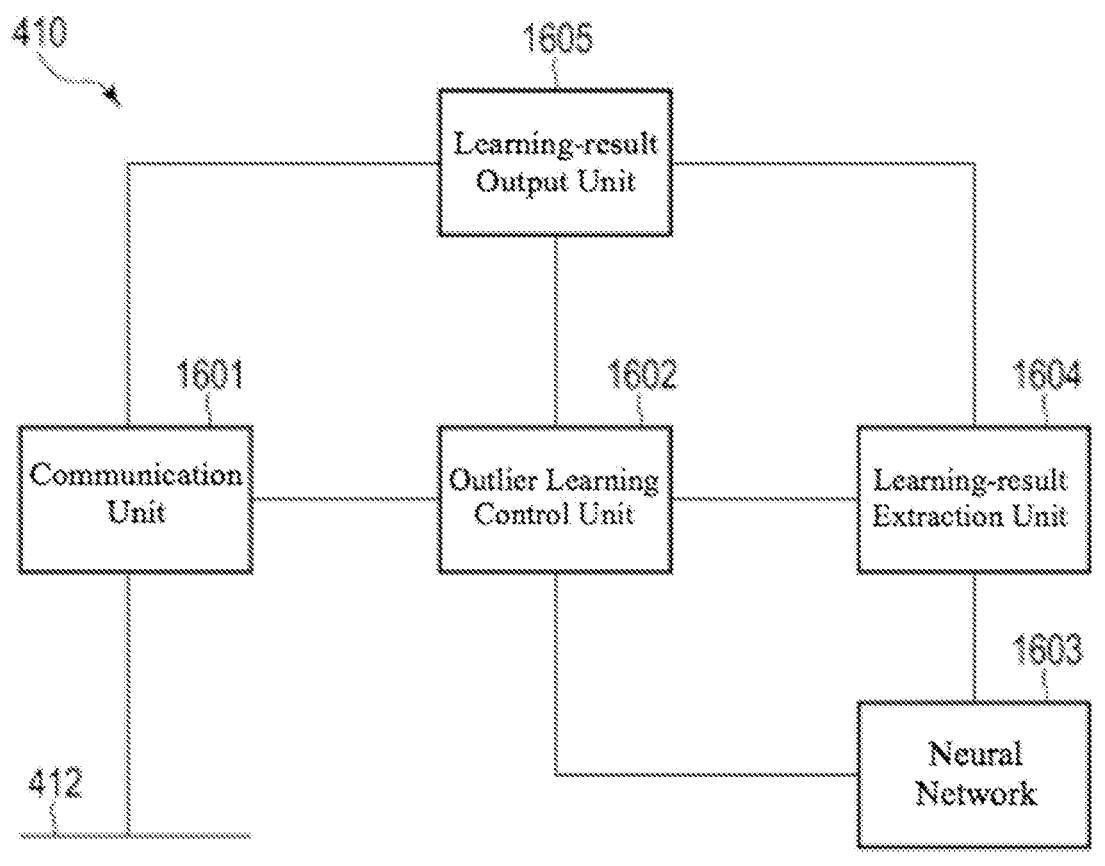
FIG. 16 is a functional block diagram illustrating a configuration of the outlier learning device shown in FIG. 4.

FIG. 16 is a functional block diagram illustrating a configuration of the outlier learning device 410. The outlier learning device 410 shown in FIG. 16 includes a communication unit 1601, an outlier learning control unit 1602, a neural network 1603, a learning result extraction unit 1604, and a learning result output unit 1605. The communication unit 1601 exchanges data with other devices it is connected with through the network 412.

The outlier learning control unit 1602 controls the process of acquiring the ability to classify outliers. The outlier learning control unit 1602 establishes hyperparameters for the neural network 1603 and learns through deep learning. The neural network 1603 may have a configuration similar to that of the neural network 1400 shown in FIG. 14. The learning performed by the neural network 1603 is not limited to deep learning; the neural network 1603 can use any method of machine learning.

The outlier learning control unit 1602 extracts data pertaining to one or more objects from data stored in the object-information DB 802 in the object-information database device 403. This embodiment uses at least the data that pertains to a designated object. The data pertaining to one or more other objects may be used as well. This is particularly helpful when the data on a designated object is limited. The outlier learning control unit 1602 extracts data from the time of an object transitions from a state A to a state B. This is teaching data pertaining to the time of transition from a state A to a state B. The outlier learning control unit 1602 also extracts data not from the time of an object transitions from a state A to a state B. This is teaching data pertaining to the time of no transition from a state A to a state B. The outlier learning control unit 1602 selects the condition-information vectors shown in FIG. 3 from the extracted data. The program for selecting the same may be prepared in advance per object type or attribute. A condition-information vector represents a condition of an object. A condition-information vector may be defined by object type or attribute. Learning with a large number of supervised learning data results in the ability to classify any condition-information vector with those similar to the condition-information vector at the time of transition from a state A to a state B and those not similar. The volume of potential factors can be significantly reduced by excluding condition-information vectors not similar to the condition-information vectors at the time of transition from a state A to a state B. This reduces the volume of data to be learned and shortens the learning time.

The learning results in an ability to classify outliers. The learning result extraction unit 1604 extracts the learning result to allow the ability acquired to be implemented in other devices. The information extracted by the learning result extraction unit 1604 is compiled into a file or the like and sent to the factor estimation device 411 by the learning result output unit 1605.

In response to a request from a user for a factor estimation, the factor estimation device 411 estimates factors that may have caused a designated object to transition from a state A to a state B. The factor estimation device 411 estimates factors using the results of learning that are output from the state-classification learning device 408 and from the condition-classification learning device 409. The factor estimation device 411 may also use the learning results that are output from the outlier learning device 410. The factor estimation device 411 can configure a neural network similar to that of the state-classification learning device 408, the condition-classification learning device 409 and the outlier learning device 410, using the data included in the learning results.

Figure 17:
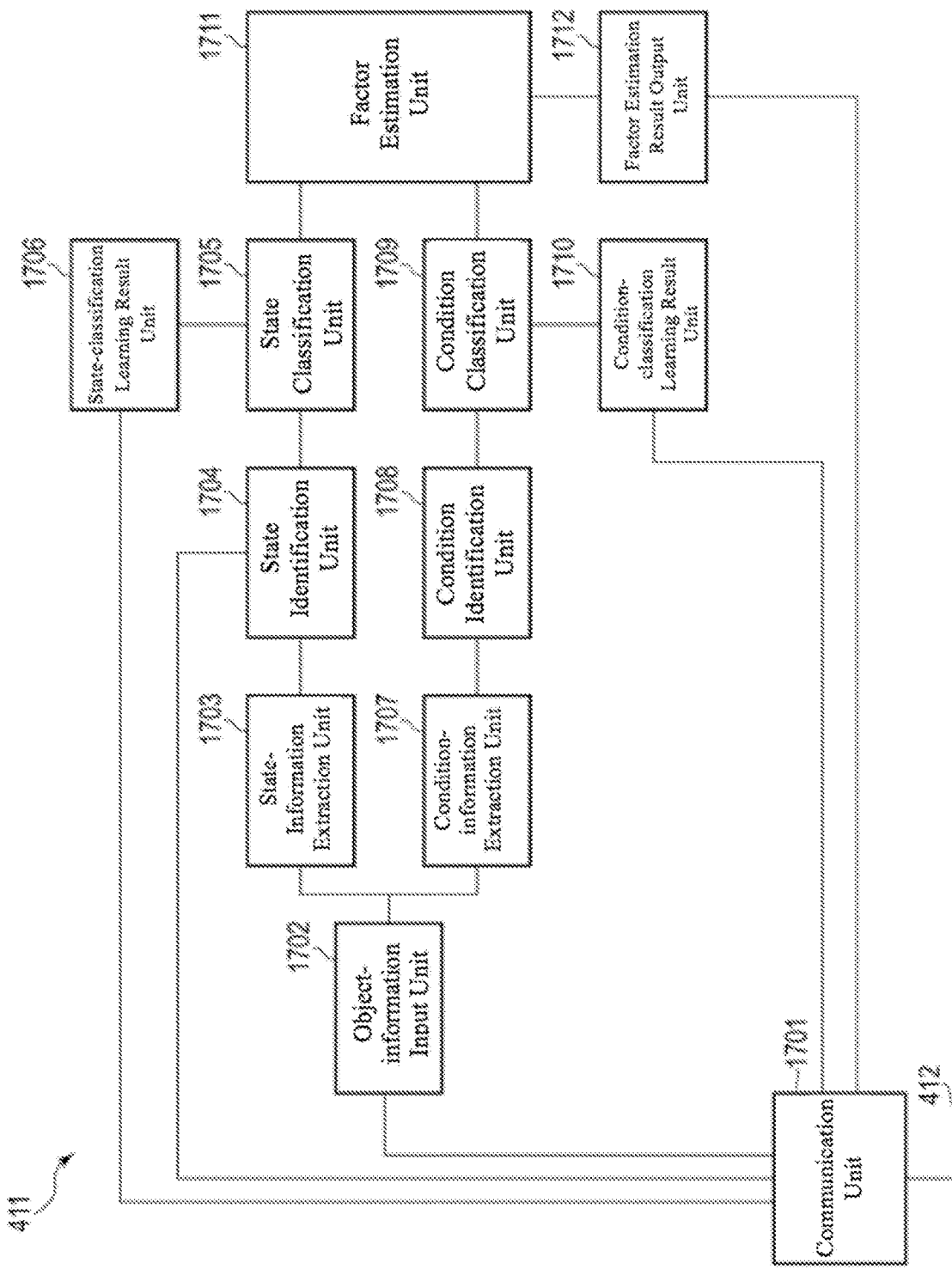
FIG. 17 is a functional block diagram illustrating a configuration of the factor estimation device shown in FIG. 4.

FIG. 17 is a functional block diagram illustrating a configuration of the factor estimation device 411. The factor estimation device 411 shown in FIG. 17 includes a communication unit 1701, an object-information input unit 1702, a state-information extraction unit 1703, a state identification unit 1704, a state classification unit 1705, a state-classification result learning unit 1706, a condition-information extraction unit 1707, a condition identification unit 1708, a condition classification unit 1709, a condition-classification result learning 1710, a factor estimation unit 1711, and a factor estimation result output unit 1712. The communication unit 1701 exchanges data with other devices connected therewith through the network 412.

The object-information input unit 1702 receives information on objects from the object-information database device 402. The object-information input unit 1702 may receive information on objects from the object-information sensor device 406. An object may include an object for which a factor is estimated (a first object). The state-information extraction unit 1703 extracts state information (state-information vectors) from the information received by the object-information input unit 1702.

The state identification unit 1704 identifies a predetermined state of a first object and extracts the state information that corresponds to the predetermined state from the state information extracted by the state-information extraction unit 1703. The predetermined state corresponds to a resulting state B. The state B can be, for example, a state for which a user may wish to estimate contributing factors. The state identification unit 1704 may further define a state A, a prior state. Other devices may detect states A and B. A support service program provided by the support device 402 runs a program that provides an individual support service according to usage by a user on any of the devices available to the user. For example, it may start an operational support app. The operational support app detects states A and B based on predetermined criteria. For example, a telematics terminal of an automobile uses a sensor to detect a driver state. For example, a state for which the driver should be alerted is detected as a state B. For example, a health care app may detect states A and B for an object. The state identification unit 1704 is notified by another device when a first object enters a predetermined state, and identifies the state based on the notification received. The notification, for example, includes time information indicating the time when the first object enters a predetermined state, and the state identification unit 1704 selects the state information of the first object at the said time from among the state information extracted by the state-information extraction unit 1703 and outputs the same to the state classification unit 1705.

The state classification unit 1705 receives the input of state information corresponding to the predetermined state from the state identification unit 1704 and classifies the state. The state classification unit 1705 may include, for example, a neural network similar to the neural network shown in FIG. 14. The unit to set the results of state-classification learning 1706 receives the learning results from the state-classification learning device 408 and establishes hyperparameters for the neural network in the state classification unit 1705 using the learning results received. This enables the state classification unit 1705 to classify states. The state classification unit 1705 classifies input state information and outputs the results of state classification to the factor estimation unit 1711.

The condition-information extraction unit 1707 extracts condition information from the information received by the object-information input unit 1702. The condition identification unit 1708 identifies the condition up until a first object enters a predetermined state and extracts condition information corresponding to the identified condition from the condition information extracted by the condition-information extraction unit 1707. The condition identification unit 1708 receives, for example, information representing a time period during which a first object transitions from a state A to a state B from the state identification unit 1704, and extracts the first object's condition information during the period of the transition, from the condition information extracted by the condition-information extraction unit 1707. The condition identification unit 1708 may extract condition information corresponding to the identified condition from all condition information except those classified by the outlier learning device 410, and input the condition in formation extracted into the condition classification unit 1709.

The condition classification unit 1709 receives the input of condition information corresponding to conditions identified by the condition identification unit 1708, classifies the identified conditions, and outputs the results of condition classification which includes one or more conditions (condition categories). The condition classification unit 1709 may include, for example, a neural network similar to the neural network shown in FIG. 14. The unit to set the results of condition-classification learning 1710 receives the results of learning from the condition-classification learning device 409 and establishes hyperparameters for the neural network in the condition classification unit 1709 using the learning results received. This enables the condition classification unit 1709 to classify conditions.

The factor estimation unit 1711 estimates conditions that may have contributed to a transition into a predetermined state based on state classification results from the state classification unit 1705 and condition classification results from the condition classification unit 1709. The factor estimation unit 1711 keeps, for example, a history of condition change patterns that represent the conditions during the transition from a first state to a second state, selects the condition change patterns that correspond to state classification results from the history, and identifies conditions common to both the selected condition change patterns and condition classification results as contributing factors. More specifically, when a change from a state A to a state B is detected, a factor for the change is estimated as follows. The factor estimation unit 1711 receives, from the condition classification unit 1709, a condition change pattern that represents the results of classifying condition-information vectors associated to the period of an object transitioning from a state A to state B. When the condition change pattern received from the condition classification unit 1709 matches any of the condition-change patterns included in the history, the factor estimation unit 1711 determines the condition indicated by the condition change pattern as a contributing factor. When the condition classification unit 1709 generates a plurality of condition change patterns, the factor estimation unit 1711 selects a pattern that matches any of the condition change patterns in the history from among the patterns received from condition classification unit 1709, and determines the condition category indicated by the selected condition change patterns as a contributing factor. When there is a plurality of matching condition change patterns, the factor estimation unit 1711 may output one or more contributing causes. Alternatively, when there is a plurality of matching condition change patterns, the factor estimation unit 1711 may output the earliest occurring condition as a contributing factor. Further, deep learning classification results may be output as numerical values in terms of their similarity to a given category. The closest condition may be determined as a factor using these numerical values.

Figure 18:
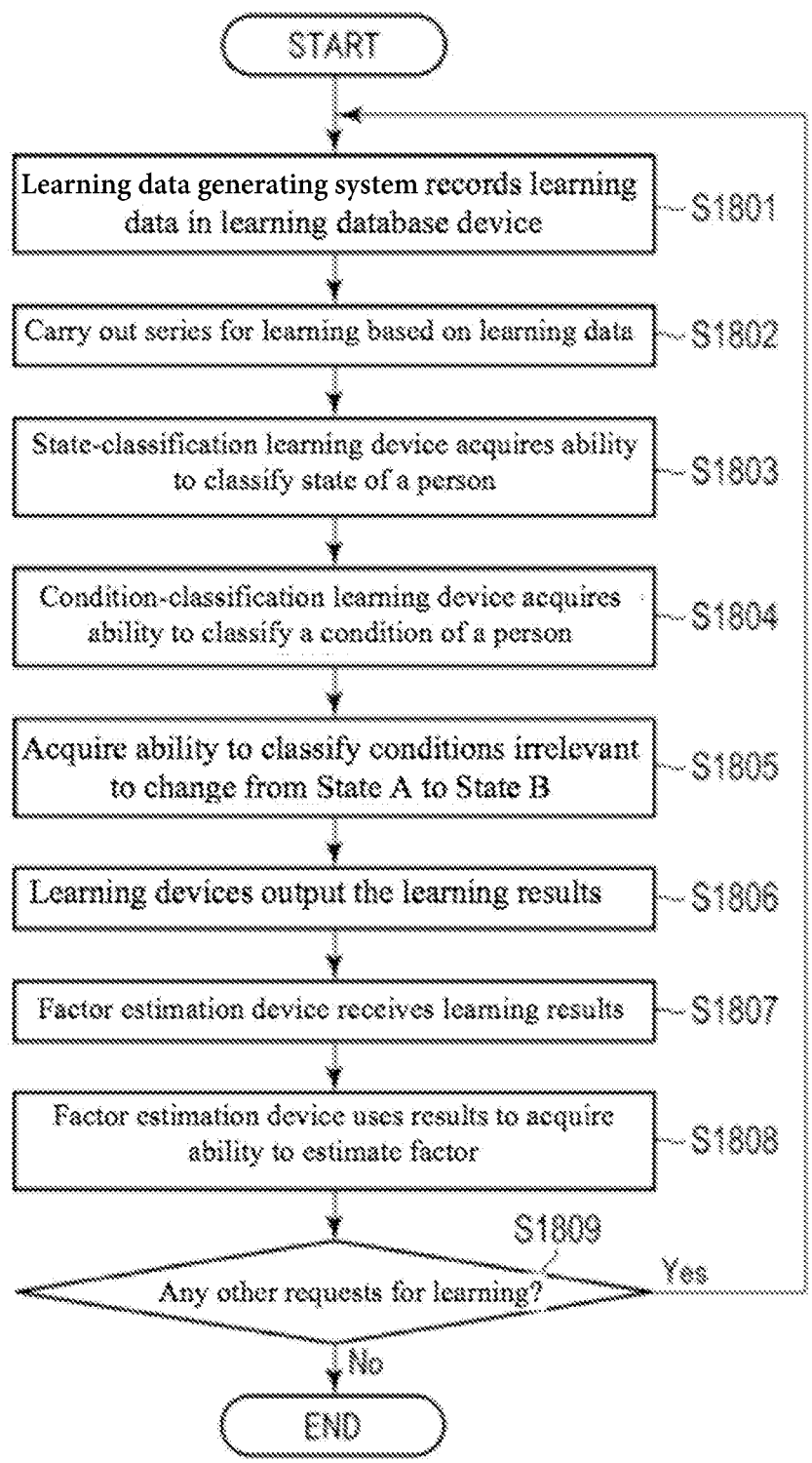
FIG. 18 is a flowchart illustrating a learning procedure according to the embodiment.

FIG. 18 illustrates a set of steps for learning according to this embodiment. The process depicted in FIG. 18 starts in response to a request for learning. In a step S1801, the learning data generating system 404 generates data for learning and stores the data generated for learning in the learning database device 407. In a step S1802, each of the learning devices performs a series of learning processes with the data for learning. More specifically, in a step S1803, the state-classification learning device 408 acquires the ability to classify the state of an object and generates learning results so that the ability acquired may be implemented in other devices. In a step S1804, the condition-classification learning device 409 acquires an ability to classify the conditions of an object and generates the learning results to allow the ability acquired to be implemented in other devices. In a step S1805, the outlier learning device 410 acquires an ability to classify conditions irrelevant to a change from a state A to a state B, and generates the learning results to allow the ability acquired to be implemented in other devices.

In a step S1806, each of the learning devices outputs learning results. In a step S1807, the factor estimation device 411 receives the learning results from each of the learning devices. In a step S1808, the factor estimation device 411 acquires the ability to estimate a factor using the learning results received.

In a step 1809, the system determines whether there is another request for learning. If there is another request, the system goes back to the step S1808 and if not, the processing ends.

Figure 19:
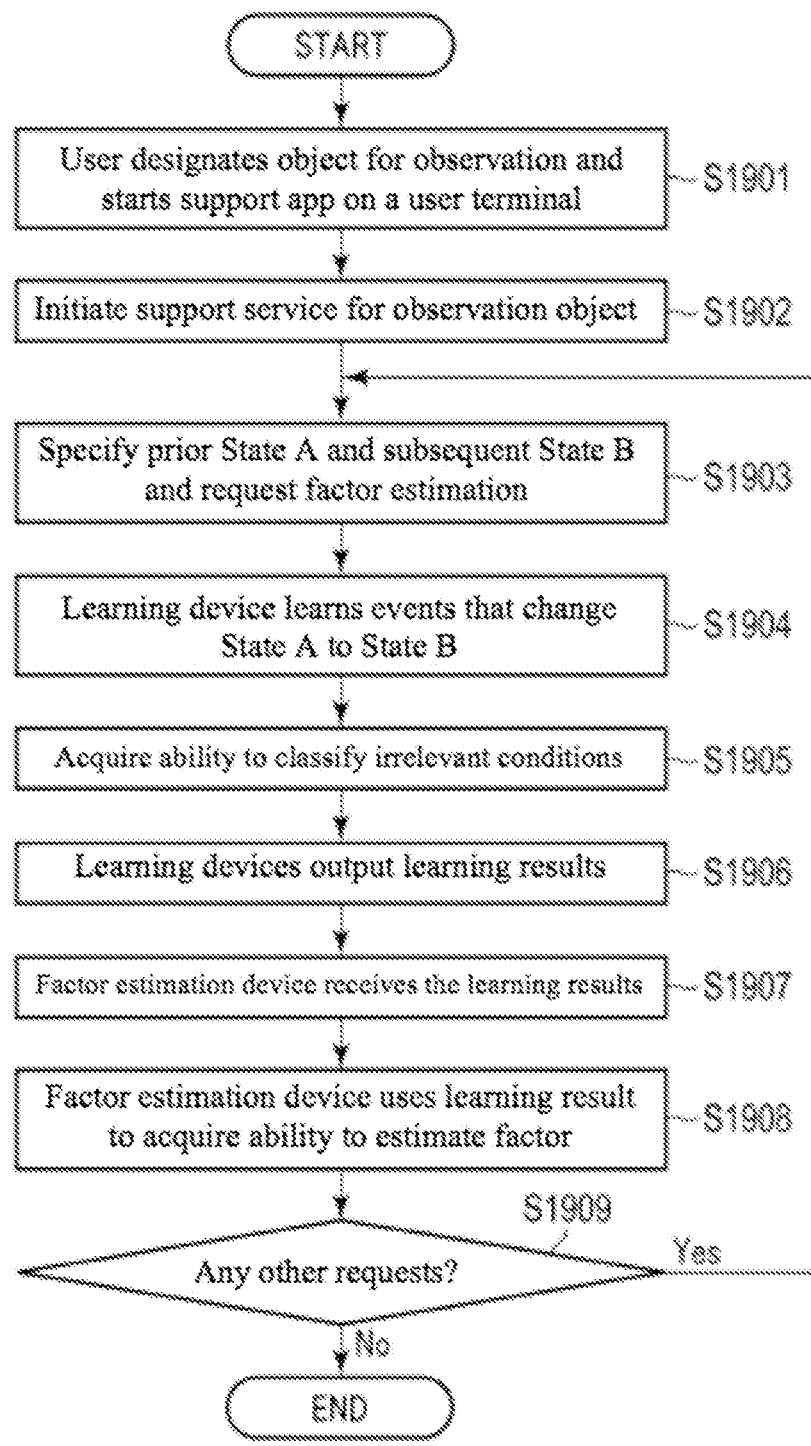
FIG. 19 is a flowchart illustrating a series of steps according to the embodiment from a factor estimation request to a factor estimation output.

FIG. 19 shows a series of steps from a factor estimation request to a factor estimation output according to this embodiment. In a step S1901 in FIG. 19, a user designates an object and starts a support app on the user terminal device 401. In a step S1902, a support service for the object is initiated. In a step S1903, the user designates a prior state A and a subsequent state B and requests factor estimation. In a step S1904, the learning devices learn the events of transition from the state A to the state B. More details are provided below in the description of steps of learning for a state-classification learning device, a condition-classification learning device, and an outlier learning device, respectively. In a step S1905, other abilities are acquired, such as this ability to classify conditions irrelevant to events of transition from the state A to the state B. In a step S1906, the learning devices output the learning results. In a step S1907, the factor estimation device 411 receives the results. In a step S1808, the factor estimation device 411 acquires the ability to estimate a factor using the received results of learning. In a step S1909, the factor estimation device 411 estimates a factor that may have resulted in the transition from the state A to the state B and outputs the estimation result.

Figure 20:
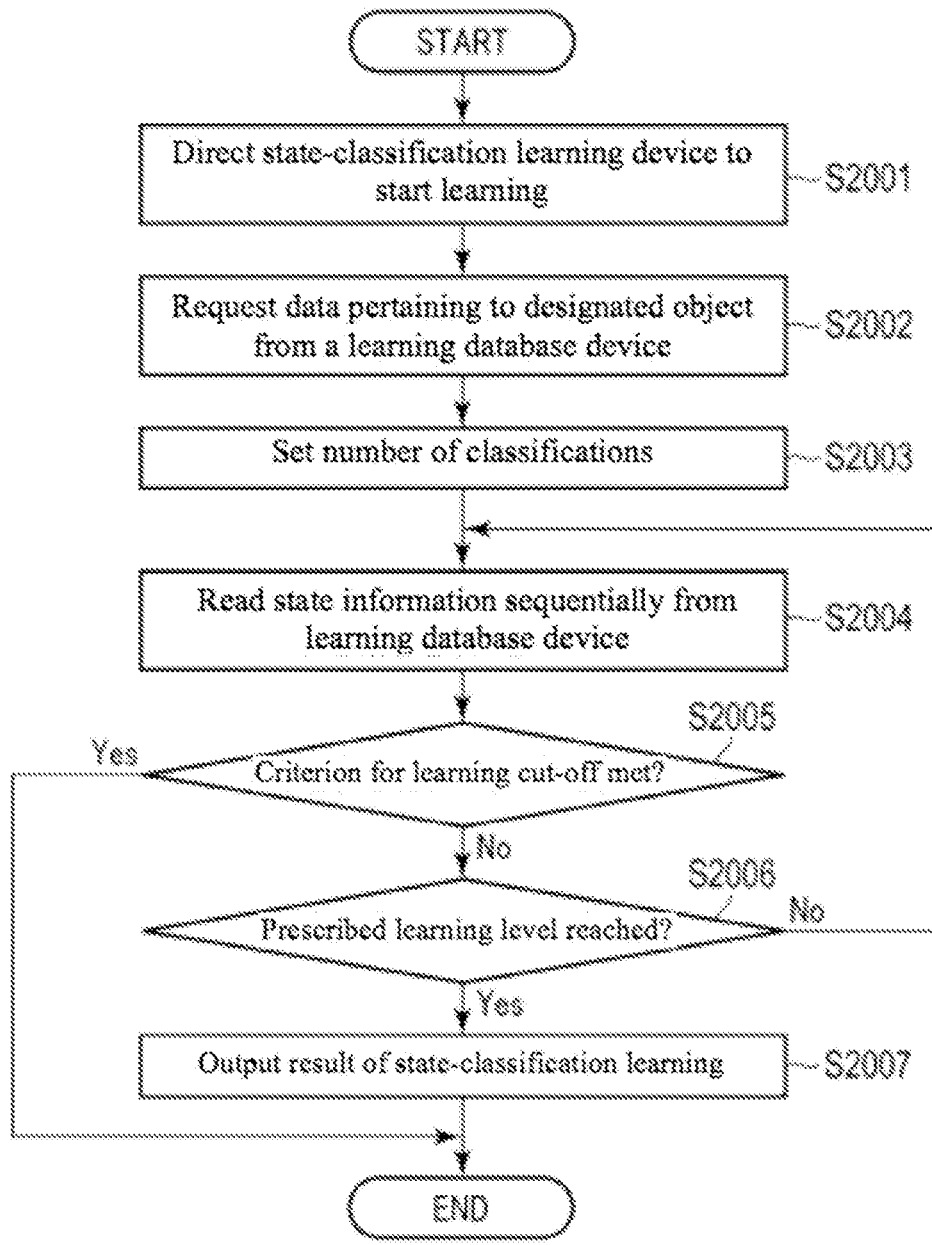
FIG. 20 is a flowchart illustrating a series of steps of learning by a state-classification learning device according to the embodiment.

FIG. 20 shows a series of steps of learning by the state-classification learning device 408 according to this embodiment. In a step S2001 of FIG. 20, the state-classification learning device 408 is directed to start learning. In a step S2002, the state-classification learning device 408 requests data on a designated object from the learning database device 407. In a step S2003, the state-classification learning device 408 sets the number of classifications. The number of classifications may be changed. The number of classifications may be set, for example, by an operator of a factor estimation system. In a step S2004, the state-classification learning device 408 receives data pertaining to the states of a designated object from the learning database device 407 and performs learning.

In a step S2005, the state-classification learning device 408 determines whether or not a criterion for a learning cut-off has been met. If the cut-off criterion has not been met, the process moves on to a step S2006, and if the criterion has been met, the process ends.

In a step S2006, the state-classification learning device 408 determines whether or not a predetermined learning level has been reached. If a predetermined learning level has not been reached, the process returns to the step S2004, and the state-classification learning device 408 acquires data on the states of another object from the learning database device 407 and performs learning again. If a predetermined learning level has been reached, the process moves on to a step S2007, where the state-classification learning device 408 outputs the results of learning.

Figure 21:
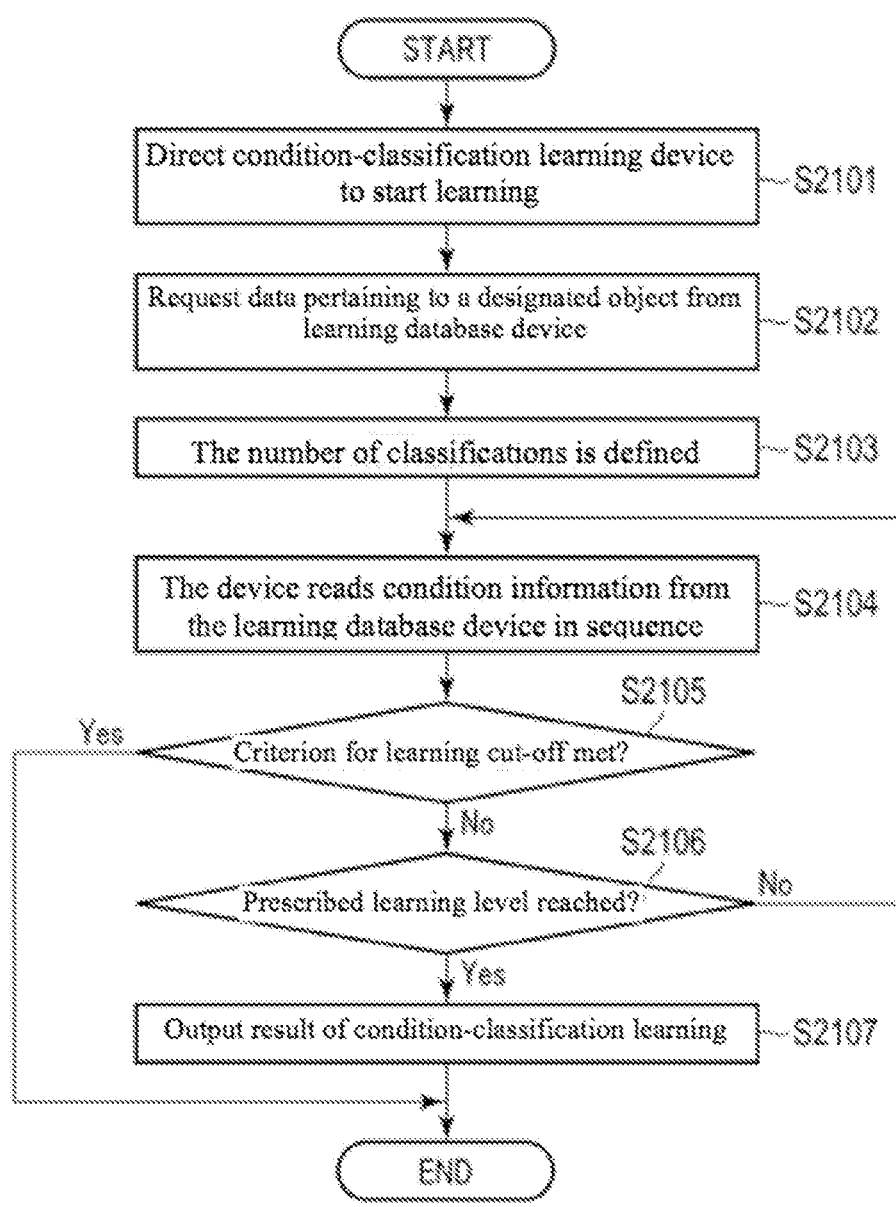
FIG. 21 is a flowchart illustrating a series of steps of learning by a condition-classification learning device according to the embodiment.

FIG. 21 shows a series of steps of learning by a condition-classification learning device 409 according to this embodiment. In a step S2001 of FIG. 21, the condition-classification learning device 409 is directed to start learning. In a step S2102, the condition-classification learning device 409 requests data on a designated object from the learning database device 407. In a step S2103, the condition-classification learning device 409 sets the number of classifications. The number of classifications may be changed. The number of classifications may be set, for example, by an operator of a factor estimation system. The number of classifications for condition classification may be different from the number of classifications for state classification. In a step S2104, the condition-classification learning device 409 receives data pertaining to the condition of a designated object from the learning database device 407 and performs learning.

In a step S2105, the condition-classification learning device 409 determines whether or not a criterion for learning cut-off has been met. If the cut-off criterion has not been met, the process moves on to a step S2106, and if the criterion has been met, the process ends.

In a step S2106, the condition-classification learning device 409 determines whether or not a predetermined learning level has been reached. If a predetermined learning level has not been reached, the process goes back to the step S2104, and the condition-classification learning device 409 acquires data on the conditions of another object from the learning database device 407 and performs learning again. If a predetermined learning level has been reached, the process moves on to a step S2107, where the condition-classification learning device 409 outputs the learning results.

Figure 22:
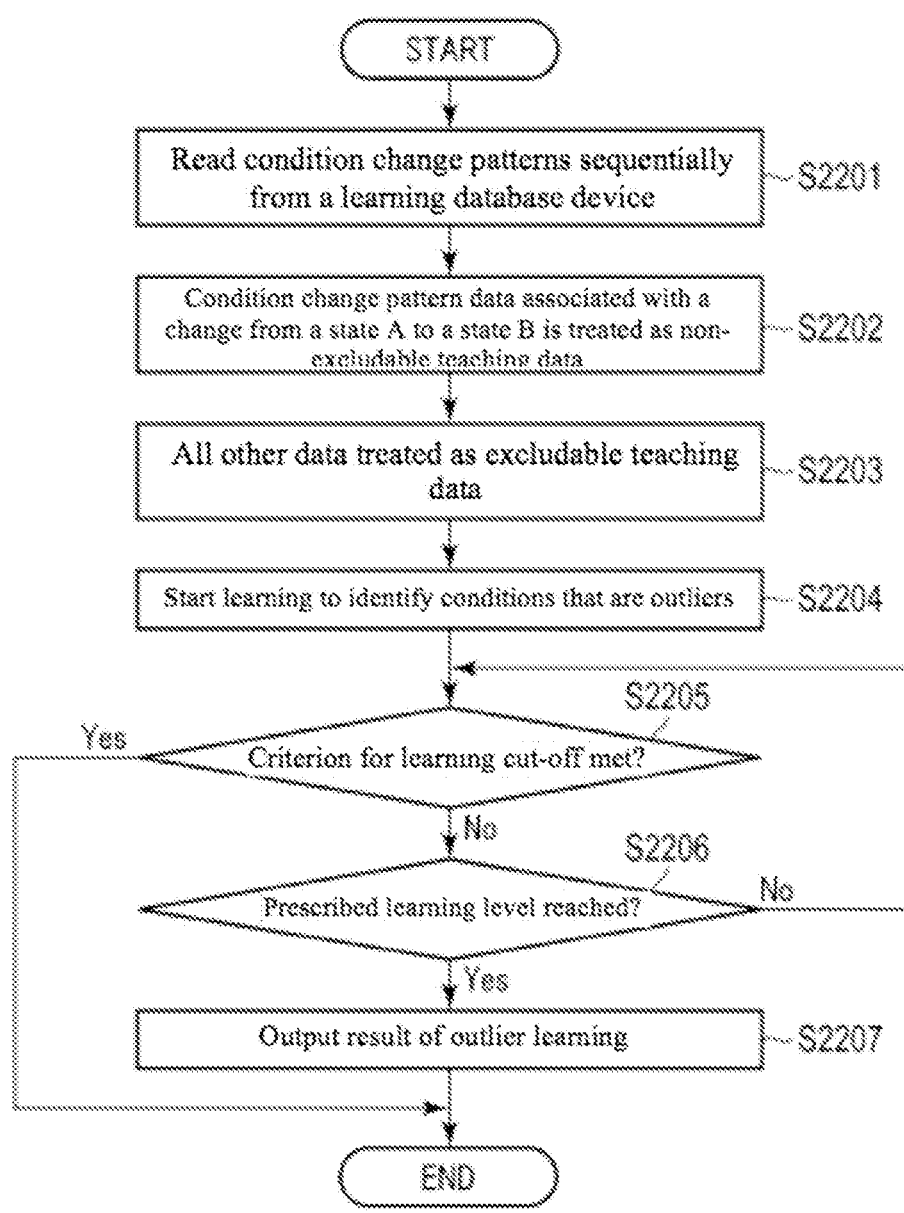
FIG. 22 is a flowchart illustrating a series of steps of learning by an outlier learning device according to the embodiment.

FIG. 22 shows a series of steps of learning by an outlier learning device 410 according to this embodiment. In a step S2201 of FIG. 22, the outlier learning device 410 receives data on condition change patterns from the learning database device 407. In a step S2202, the outlier learning device 410 generates condition change pattern data associated with the change from a state A to a state B as non-excludable teaching data. In a step S2203, the outlier learning device 410 generates all other condition change pattern data as excludable teaching data. The learning data generating system 404 may create the non-excludable teaching data and the excludable teaching data.

In a step S2204, the outlier learning device 410 uses non-exclusion and exclusion teaching data to learn to identify outliers. In a step S2205, the outlier learning device 410 determines whether or not criteria for learning cut-off has been met. If the cut-off criterion has not been met, the process moves on to a step S2206, and if the criterion has been met, the process ends therewith.

In a step S2206, the outlier learning device 410 determines whether or not a predetermined learning level has been reached. If a predetermined learning level has not been reached, the process goes back to the step S2201, and the outlier learning device 410 acquires more condition change pattern data and learns again. If a predetermined learning level has been reached, the process moves on to a step S2207, where the outlier learning device 410 outputs the results of learning.

Figure 23:
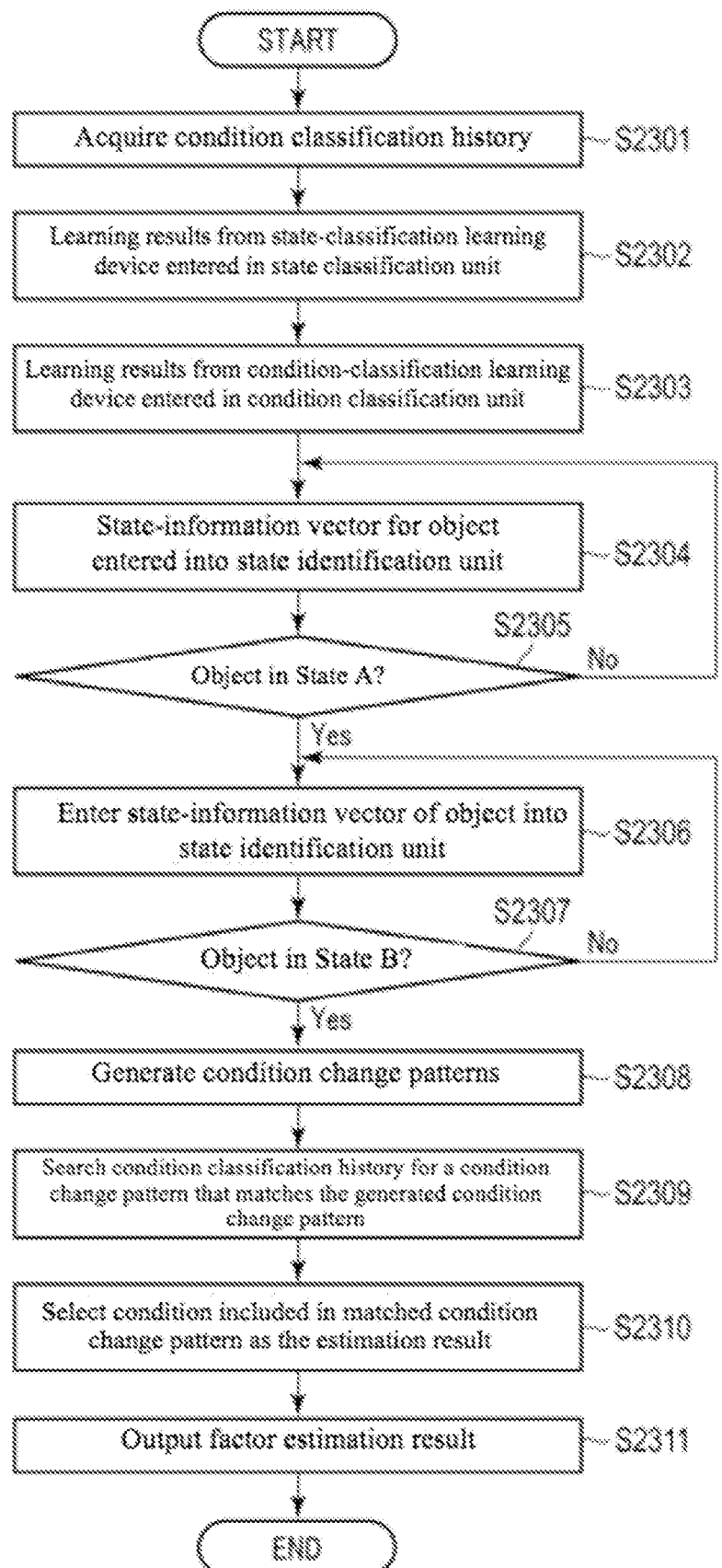
FIG. 23 is a flowchart illustrating a series of steps of factor estimation by a factor estimation device according to the embodiment.

FIG. 23 shows a series of steps of operation by the factor estimation device 411 according to this embodiment. In a step S2301 of FIG. 23, the factor estimation unit 1711 acquires a condition classification history including a plurality of condition change patterns. In a step S2302, the state-classification learning result unit 1706 applies the learning result received from the state-classification learning device 408 to the state classification unit 1705. In a step S2303, the condition-classification learning result unit 1710 applies the learning result received from the condition-classification learning device 409 to the condition classification unit 1709.

In a step S2304, the state-information extraction unit 1703 enters the state-information vectors for an object into the state identification unit 1704. In a step S2305, the state identification unit 1704 determines whether or not the object has entered a state A, which is a prior state. If the object is not in the state A, the process returns to the step S2304. If the object is in the state A, the state identification unit 1704 selects the state-information vector that corresponds to the state A from among the vectors input, and the process moves to a step S2306.

In a step S2306, the state-information extraction unit 1703 further enters the state-information vectors of the object into the state identification unit 1704. In a step S2307, the state identification unit 1704 determines whether or not the object has entered a state B, which is a subsequent state. If the object is not in the state B, the process returns to the step S2306. If the object is in the state B, the state identification unit 1704 selects state-information vectors that correspond to the state B from among the vectors input, and the process moves to a step S2308.

In a step S2308, the condition classification unit 1709 generates a condition change pattern. In a step S2309, the factor estimation unit 1711 searches the condition classification history for a condition change pattern that matches the generated pattern. In a step S2310, the factor estimation unit 1711 determines a condition included in the matched condition change pattern as the estimation result. In a step S2310, the factor estimation result output unit 1712 outputs the estimation result.

The structure and operation of a factor estimation system is described above. Some additional, more specific descriptions are provided below.

Deep learning uses a large volume of data for learning specific abilities such as the ability to classify or to predict. If the amount of data used for deep learning is too large, however, learning cannot be completed within a given time using devices of a given scale. A factor estimation system acquires a massive amount of data including those irrelevant to an object for observation. This sometimes necessitates limiting the range of data used for factor estimation. Ideally, a limit should be placed based on the service offered to users or the device used. A limit may be placed, for example, according to a contract with users. In this case, the scope of responsibilities of the system may be clearly defined because the scope of data is limited according to an agreement with users.

The scope of data may be limited by certain criteria. For example, when the object is a person, a subset smaller than a total population may be created using attributes such as age, sex, nationality, area of residence and occupation. The amount of data processed by the system may still be too large even after scope of the data is limited by an attribute. In that case, the amount of data must be further reduced. However, excess reduction in the amount of data increases the likelihood that a contributing factor will be missed. It is desirable to exclude data that is unlikely to contain a contributing factor.

Some data related to external factors may be excluded. For example, data on external factors that are known to have very little impact may be excluded. A criterion may be established to specify the data to be excluded; for example, data on external factors deemed unaffected by attributes of an object for observation, data on sports not played by the object for observation, and data on geographical areas which are not of an interest to the object for observation, not included in latest news, never visited by the object for observation, or not generally known.

The amount of data to be processes may also be reduced by classifying the input data. Data consisting of multidimensional vectors is often sparsely distributed. Generally speaking, the greater the dimensionality of vectors in the data, the more sparse the distribution. The amount of data for sparsely distributed multidimensional vectors can be significantly reduced by classification. When classified data is sequenced in time series, the sequence of classified data may be further classified to significantly reduce the volume of data.

This section will describe examples of input data.

If the object is a person, input data includes information pertaining to the person and information pertaining to the environment surrounding the person. The information pertaining to a person should be managed to respect the privacy of the person. Types of information to be acquired may be decided based on a user request, a contract with a user, a device configuration, and the like.

The information on a person can include information on the biological state of the person. The information on the biological state may be obtained through wearable sensors, e.g., a smartphone, a smart watch, and a biometric sensor. The information on the biological state of a person may be obtained from an accelerometer installed in a smartphone or from an application run on a smartphone. Because a smart watch is in contact with a person's body, a smart watch can obtain more detailed information than a smartphone. A biometric sensor measures, for example, the heart rate and the saturation of percutaneous oxygen. A biometric sensor may be, for example, connected to or installed in a smartphone. Sensors in the environment may be used to obtain information on the biological state. The information on the biological state may also be obtained by, for example, IoT. More specifically, an existing device located in the environment of the person may be used as a sensor that obtains information on the person. For example, when a piece of information is obtained indicating that "a person was detected at the entrance of the stairs on the first floor and subsequently detected on the fourth floor," the amount of physical exercise for the person may be calculated from this information. This kind of information may be obtained through a combination of a surveillance camera and a facial recognition device. Information on the biological state may include information on food and beverage. Cooking recipes and information made available by restaurants may also be used. A person who is an object for observation may enter food and beverage information, for example.

Information on a person can include an activity history of the person. An activity history may include tracked exercise amount and productivity. Information on exercise amount may be obtained through a wearable sensor. Information on productivity includes, for example, information on activities such as driving an automobile. Information on productivity may be obtained from applications used on a PC, a smartphone, or other IT terminals. Information on driving an automobile, for example, may be obtained from an automobile, a smartphone, or the like.

Information pertaining to an environment surrounding the person may be obtained, for example, from a device attached to a building. For example, a variety of devices installed in a single-family home or an apartment may be used. Also, a variety of devices installed in office buildings, schools, and other buildings may be used. Surveillance cameras can provide information on visitors. A heating, ventilation, and air conditioning (HVAC) system can provide information on a person's environment. The training equipment installed in a fitness club can provide information on a person's state and activities. A transaction monitoring system installed at a shopping mall can provide information on purchasing activities. A device installed at an amusement facility can provide information on visits to the venue. A device installed at a hospital can provide information on the state of the person.

Information pertaining an environment surrounding the person may be obtained from a device attached to mobile bodies such as automobiles and public transportation. Also, because a person uses a variety of work or educational applications on devices in their environment, information on work or education may be obtained from the work or educational applications. The use history of various applications may be extracted to obtain information on what may have affected a person during work or study. Also, information pertaining to an environment surrounding the person can include information from a business. Information from a business represents, for example, information pertaining to a user's usage of services provided by the business. Moreover, information pertaining to an environment surrounding the person can include information from an information service provider. Information from an information service provider represents, for example, information on contents of information provided by the information service provider and the usage thereof. Furthermore, information pertaining to a person's surrounding environment can include information from an IoT service. Information from an IoT service includes, for example, information acquired on a person from an IoT terminal, a server or a cloud system.

When the object is an inanimate object (e.g., a machine), input data may include information acquired from the object and information acquired from devices in around the object. The object and the devices around the object can be connected to a network.

This section will explain how data is input using an example of integrated support services. Integrated support services monitor the overall activities of a person 24 hours a day and seven days a week. A user is provided with support services via a support program or support content on a terminal device such as the user's PC or smartphone, or a terminal for specific business purposes. A support device provides integrated support services; a support program on a support device administers the integrated support services. This support program works in conjunction with a support program or support content made available on a user's terminal device. The support program uses devices in the surrounding environment to support the object, in this case a person. This enables the support program to acquire information on the person and their surrounding environment. It is possible to acquire information pertaining to the object's states and conditions by specifying the object.

This section will explain how to request factor estimation. A user may request factor estimation in advance; for example, the user may request that factor estimation is performed whenever a certain outcome is detected. The user may be notified of the result of factor estimation, for example, by vibration or a presentation on a terminal device such as a smartphone or a smart watch. A user may also request factor estimation at any time.

This section will describe a method of identifying a resulting state B. When estimating a factor, a user, for example, designates two states (a prior state A and a subsequent state B). If a user does not designate a prior state, an initial state of an object may be decided as a prior state A. An input of information, such as time, to help identify a state can be omitted by allowing a user to designate the current state as a state B. Alternatively, the state of an object when a wearable sensor detects the object to be in a specific state (e.g., an object is under a great stress) may be decided as a state B.

This section will describe an application of a factor estimation system. Discussed first is an application involving a person as the object. Combining a plurality of applications described below would allow a reciprocal use of information and help provide integrated services for factor estimation.

The first application discussed is a service to monitor a state of a person. This service acquires information pertaining to the states of a person related to exercise, meals, and work as well as information pertaining to the conditions of the person, and uses the acquired information to estimate a condition that may have resulted in the person entering a specific state.

Exercises affect a person's pattern of life. People with similar constitutions and patterns of life tend to be affected by similar factors, which lead to similar outcomes. Information pertaining to exercise includes, for example, the amount of exercise and the level of physical activity. The amount of exercise and the level of physical activity can be obtained through an activity sensor, a smart watch, a smartphone and the like. It is known that the body weight varies based on a caloric intake and the amount of exercise.

What a person eats significantly affects the person's state. Information pertaining to what a person eats may be obtained by, for example, extracting information on purchased lunch from credit card or electronic money payment stores. Alternatively, a person may input information on what they eat using a terminal device such as a smartphone and a PC. Information on what a person eats may be obtained from a payment terminal in a restaurant. A payment terminal, for example, may maintain a table of menus of meals and their nutritional contents, and obtain nutritional information of a meal input by referring to the table.

Information on work may be obtained through an operational support app explained later. Information on work includes, for example, work done by a person during work hours and an environment under which the work was performed.

It is desirable for a service that monitors the state of a person to also have a function to offer advice. To estimate and inform the user of a factor that may have resulted in the current state serves as an effective form of advice. It is generally known that there is a strong correlation between the amount of exercise and changes in body weight. While people can accurately remember how much exercise they did a day ago, they can hardly remember how much exercise they did a week or so ago. While body weight changes are affected by the amount of exercise over a period of several months, not many people keep track of the amount of exercise over time. Estimating and communicating factors for body weight increases and decreases helps a person recognize good and bad parts of their lifestyle. This helps people try to improve their lifestyles. Also, by learning with information pertaining to a large number of people, the system is able to predict body weight changes based on sustained current lifestyle. It is also effective to communicate such information as a part of the advice.

As described above, a factor estimation system may be applied to a service that monitors the state of a person. The method described above may also be used in the applications described below.

The second application discussed is a service to support a person's work. The state of a person impacts performance. This service acquires information on a person's work and on conditions of the person, and uses the acquired information to estimate a condition that may have resulted in the person entering a specific state.

Overwork is a social problem and corporations are called to address this issue. However, a corporation can only acquire limited information on its employees outside business hours. A corporation can help avoid the overwork problem by hiring an outside business to monitor its employees. A factor estimation system according to this embodiment may be used to allow the surveillance of the state of objects (e.g., employees) and their conditions without human intervention.

The service according to the second application can suggest a way to improve operational efficiency upon detecting a certain state. For example, if this service detects a predetermined abnormality in an employee at the start of work in the morning, the service estimates a possible impact of the pattern of life and suggests a way to improve the patterns of life on the basis of the result of estimation. In another example, if this service detects a predetermined abnormality in an employee at the start of work in the afternoon, it notifies the supervisor of the employee. Upon being notified, the supervisor can reach out to the employee and ask if they are okay and if they might benefit from taking a break. In still another example, this service can detect an overly stressed state based on state-information vectors indicated by an employee's biometric sensor. In yet another example, this service can identify a state A, the state prior to a period of a higher operational efficiency, and a state B, the state during the period of a higher operational efficiency, and estimate factors that may have caused the transition from the state A to the state B as the factors of improved operational efficiency.

Further, the service according to the second application can detect information on abnormalities, and estimate the impact of the abnormalities on the employees at work based on a predetermined logic. Abnormalities include, for example, a surveillance device defect, an operational system failure, an abnormality in what an employee is working on, and an abnormality in the employee. When a surveillance device is out of order, the service registers that data is missing. When an operational system experiences a failure, the service determines the impact thereof, based the time of occurrence and description of the failure obtained from the operational system, and stores the same. The sensor installed on an object an employee is working on sends information on the abnormalities of the object. Based on this information and on the relationship between the object of work and the employee, an impact on the employee is estimated. Abnormalities in an employee significantly affect their operational efficiency. It is desirable to store factors that may have resulted in any employee abnormalities. Employee abnormalities include, for example, work interruptions, excessive activities, unusual biological information, and positional information (for example, an employee is detected to be at an unexpected location), and the like.

The third application discussed is a service to support driving an automobile. A control device installed on an automobile alone cannot track a driver state and conditions while the driver is not in the automobile. A support content or app stored in a support device (e.g., the support device 402 shown on FIG. 4) can be downloaded to a telematics terminal on a vehicle. The telematics terminal can support a driver while driving and provide the driver's information to the vehicle control device. The telematics terminal can acquire information on the driver state from a driver monitoring cameras or a biometric sensor installed on the vehicle, as well as a wearable terminal, a smart watch worn or a smartphone carried by the driver. A support app can keep track of states and conditions detected from the driver before they get into the vehicle. A support app can estimate a factor associated with the driver state changing from a state A to a state B, and can support the driver driving based on the result of estimation.

The fourth application discussed is a service that supports the activities of a person at home and elsewhere (e.g., at work, school, or a hotel). Factors that may impact people are present in many situations. Home environmental factors such as temperature, humidity, pressure, noise, and odor can have a significant impact on people. Abnormally low and high temperatures can have a particularly great impact. The environmental factors may be detected with sensors and stored to help estimate the degree of impact of environmental factors on people. Also, if detailed information on environmental factors can be acquired from an HVAC system, the degree of impact of environmental factors on people can be understood in greater detail. Information on the home can be acquired, for example, from a security sensor in a security system. People are interested in information and news related to their family (e.g., parents, children, and spouse) and pets, and are affected by this kind of information and news. People are often concerned of how their pets are doing while they are gone, and are relieved by being communicated the state of the pet. A person's interest may be identified by referring to requests for subscription to news delivery services. The criteria to assess the interests of an individual established in advance per person allows the service to estimate an impact of specific news on an individual.

As described above, factors that may impact specific people are present in many situations. Conventional segmented services are often not conducive to identifying what impacts the present state. Configured as above, the system can prevent factors being overlooked or misjudged.

Next, an application involving a machine as the object is described. A factor estimation system according to this embodiment can handle a machine object in the same manner as the system handles a human object. When a person operates a machine, for example, the machine becomes a part of the environment for the person.

When the object is an automobile, a support app can acquire driver information that may significantly impact the vehicle in the same way as described for a human object.

The support app can acquire information on an automobile state, operation history and an operation environment from a control device for the vehicle. The support app can also acquire externally-sourced information on roads, weather, earthquakes, and the like. A factor estimation system can learn from these types of information to acquire the ability to estimate factors.

Assume the object is processing equipment; information on the condition of the equipment may be obtained from a device located in the surroundings of the equipment. The processing equipment is impacted by devices in the surroundings and devices connected thereto via a network. Form a factor estimation system's perspective, this is same as a person object being impacted by the environment. Accordingly, the system can learn to acquire the ability to estimate a factor that results in a certain state.

As described above, a factor estimation system according to this embodiment involves a state-classification learning device that acquires the ability to classify the state of an object by learning to classify data pertaining to the state of the object (state-information vectors); generates results of the state-classification learning to allow other devices to implement the ability acquired; and applies the results generated from state-classification learning to the neural network of the factor estimation device. The factor estimation device can thus acquire the ability to classify the state of an object. A factor estimation system according to this embodiment also involves a condition-classification learning device that acquires the ability to classify the condition of an object by learning to classify data pertaining to the condition of an object (condition information vectors); generates results of the condition-classification learning to allow other devices to implement the ability acquired; and applies the results generated from condition-classification learning to the neural network of the factor estimation device. The factor estimation device can thus acquire the ability to classify the condition of an object. A factor estimation device detects when an object enters a state A and a state B through classifying the state of the object, and detects the conditions the object is under during the period the object transitions from a prior state A to a subsequent state B by classifying the condition of the object. A factor estimation device acquires a condition classification history, which includes condition change patterns representing conditions during the period the object transitions from a state A to a state B. When the condition classification history includes a condition change pattern that matches the detected condition, the device determines the detected conditions as a contributing factor. This enables the system to estimate factors that result in an outcome.

The present invention is not limited to the above-described embodiment and various modifications can be made as long as such modifications do not do not deviate from the substance of the invention. Also a various implementations may be formed through combining a plurality of components disclosed in the above-described embodiment as desired. For example, some of the components described in the embodiment may be eliminated. Further, components belonging to different embodiments may be combined as needed.

All or a part of the above-mentioned embodiment may be as described in the following postscript, but is not limited to the postscripts:

(Postscript 1)
A factor estimation device including: a hardware processor, and
a memory connected to the hardware processor; and
the hardware processor being configured to:
receive information pertaining to objects;
extract state information from the information received;
identify a predetermined state pertaining to a first object from among the objects;
receive the state information extracted that corresponds to the predetermined state, and
classify the aforementioned predetermined state;
extract a condition information from the information received;
identify the condition up until the predetermined state;
receive the input of the condition information extracted that corresponds to the condition identified, and classify the aforementioned condition identified;
and estimate the condition that may result in the predetermined state on the basis of the result of classifying the predetermined state and of the classifying the identified condition.

(Postscript 2)
A factor estimation method including: using at least one hardware processor to receive information pertaining to objects;
using at least one hardware processor to extract state information from the information received;
using at least one hardware processor to identify a predetermined state pertaining to a first object from among the objects;
using at least one hardware processor to receive the input of state information extracted that corresponds to the predetermined state, and to classify the aforementioned predetermined state;
using at least one hardware processor to extract condition information from the information received,
using at least one hardware processor to identify condition up until the predetermined state,
using at least one hardware processor to receive the input of condition information extracted that corresponds to the condition identified, and to classify the aforementioned condition identified;
using at least one hardware processor to estimate the condition that may result in the predetermined state on the basis of the result of classifying the predetermined state and the result of classifying the identified condition.

The invention claimed is:
1. A factor estimation device comprising a neural network and a processor configured with a program to perform operations comprising:
receiving information pertaining to objects, the information comprising state information and condition information;
extracting the state information from the received information, the state information comprising information pertaining to a current state and a previous state or states of each of the objects;
performing machine learning for classifying states of each of the objects and generating a state classification learning result, by performing, using the neural network, non-supervised deep machine learning on the extracted state information to acquire an ability to classify the state information into a predetermined number of state categories and generating the state classification learning result by the non-supervised deep machine learning on the extracted state information;

identifying a predetermined current state pertaining to a first object from among the objects;

receiving the extracted state information corresponding to the predetermined current state from among the extracted state information, and classifying, using the state classification learning result, the predetermined current state based on the previous state or states;

extracting the condition information from the received information, the condition information comprising at least one of: an external factor pertaining to a surrounding environment of the first object, and an intrinsic factor pertaining to the first object itself, the condition information extracted for the first object having the predetermined current state and for the first object having the previous state or states;

performing machine learning for classifying conditions of each of the objects and generating a condition classification learning result, by performing, using the neural network, non-supervised deep machine learning on the extracted condition information to acquire an ability to classify the condition information into a predetermined number of condition categories and generating the condition classification learning result by performing the non-supervised deep machine learning on the extracted condition information;

identifying a condition associated with the at least one of: the external factor and the intrinsic factor for a previous state of the first object and corresponding to a time period up until a transition to the predetermined current state;

receiving the extracted condition information which corresponds to the identified condition and the at least one of: the external factor and the intrinsic factor for the previous state of the first object from among the extracted condition information, and classifying the identified condition, using the condition classification learning result, to generate a condition change pattern; and estimating which of the at least one of the external factor and the intrinsic factor associated with the identified condition results in the transition from the previous state or states to the predetermined current state of the first object, on a basis of: a current condition for the predetermined current state; a classification of the predetermined current state; and the condition change pattern generated by classifying the identified condition, wherein classifying the predetermined state using the state classification learning result and classifying the identified condition using the condition classification learning result reduces a volume of data processed for estimating which of the at least one of the external factor and the intrinsic factor results in the transition and increases a speed of determination of identifying the condition that results in the transition.

2. The factor estimation device according to claim 1, wherein the processor is configured with the program to perform operations such that estimating the at least one of the external factor and the intrinsic factor comprises storing a history of the condition change pattern that represents a condition during a period of transition from a designated first state to a second state; and identifying, as a factor, a condition common to a condition change pattern corresponding to a result of classifying the predetermined state and a result of identifying the condition.

3. The factor estimation device of claim 1, wherein the received information comprises outlier information, the processor is further configured with the program to perform operations comprising:

extracting the outlier information from the received information, the outlier information comprising information pertaining to outlier states of each of the objects, performing machine learning to learn outlier states based on the outlier information and generating an outlier classification learning result; and eliminating irrelevant condition information using the outlier classification learning result to reduce a volume of the extracted condition information prior to the classifying the identified condition to generate the condition change pattern.

4. The factor estimation device of claim 1, wherein the condition information comprises time-series data on each object.

5. A factor estimation method comprising:

receiving information pertaining to objects, the information comprising state information and condition information;

extracting the state information from the received information, the state information comprising information pertaining to a current state and a previous state or states of each of the objects;

performing machine learning for classifying states of each of the objects and generating a state classification learning result, by performing, using a neural network, non-supervised deep machine learning on the extracted state information to acquire an ability to classify the state information into a predetermined number of state categories and generating the state classification learning result by the non-supervised deep machine learning on the extracted state information;

identifying a predetermined current state pertaining to a first object from a plurality of objects;

receiving the extracted state information corresponding to the predetermined current state, and classifying, using the state classification learning result, the predetermined current state based on the previous state or states;

extracting the condition information from the received information, the condition information comprising at least one of: an external factor pertaining to a surrounding environment of the first object, and an intrinsic factor pertaining to the first object itself, the condition information extracted for the first object having the predetermined current state and for the first object having the previous state or states;

performing machine learning for classifying conditions of each of the objects and generating a condition classification learning result, by performing, using the neural network, non-supervised deep machine learning on the extracted condition information to acquire an ability to classify the condition information into a predetermined number of condition categories and generating the condition classification learning result by performing the non-supervised deep machine learning on the extracted condition information;

identifying a condition associated with the at least one of: the external factor and the intrinsic factor for a previous state of the first object corresponding to a time period up until a transition to the predetermined current state;

receiving the extracted condition information that corresponds to the identified condition and the at least one of: the external factor and the intrinsic factor for the previous state of the first object, and classifying, using the condition classification learning result, the identified condition to generate a condition change pattern; and estimating which of the at least one of the external factor and the intrinsic factor associated with the identified condition results in the predetermined current state, on a basis of: a current condition for the predetermined current state; a classification of the predetermined current state; and the condition change pattern generated by classifying the identified condition, wherein classifying the predetermined state using the state classification learning result and classifying the identified condition using the condition classification learning result reduces a volume of data processed for estimating which of the at least one of the external factor and the intrinsic factor results in the transition and increases a speed of determination of identifying the condition that results in the transition.

* * * * *